US 11,752,580 B2

(12) United States Patent
Henderkott et al.

(10) Patent No.: US 11,752,580 B2
(45) Date of Patent: Sep. 12, 2023

(54) BONDING SYSTEM FOR DUAL WALLED TURBINE COMPONENTS

(71) Applicant: Rolls-Royce Corporation, Indianapolis, IN (US)

(72) Inventors: Joseph P. Henderkott, Indianapolis, IN (US); Timothy Fuesting, Indianapolis, IN (US); Raymond Xu, Indianapolis, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 0 days.

(21) Appl. No.: 17/853,216

(22) Filed: Jun. 29, 2022

(65) Prior Publication Data
US 2022/0347802 A1 Nov. 3, 2022

Related U.S. Application Data

(62) Division of application No. 16/807,107, filed on Mar. 2, 2020, now Pat. No. 11,400,551.

(51) Int. Cl.
*B23P 15/04* (2006.01)
*F02C 7/00* (2006.01)

(52) U.S. Cl.
CPC ............... *B23P 15/04* (2013.01); *F02C 7/00* (2013.01); *F05D 2220/32* (2013.01); *F05D 2230/232* (2013.01); *F05D 2240/12* (2013.01); *F05D 2240/30* (2013.01)

(58) Field of Classification Search
CPC ............ F05D 2240/12; F05D 2240/30; F05D 2220/32; F05D 2230/232; F02C 7/00; B23P 15/04
See application file for complete search history.

(56) References Cited

U.S. PATENT DOCUMENTS

| 2,094,784 | A | 10/1937 | Bremer |
| 4,954,687 | A | 9/1990 | Bush et al. |
| 5,047,608 | A | 9/1991 | Takahashi et al. |
| 6,156,992 | A | 12/2000 | Besslein |
| 7,718,918 | B2 | 5/2010 | Spinella et al. |
| 9,440,308 | B2 | 9/2016 | Roddy et al. |

(Continued)

FOREIGN PATENT DOCUMENTS

WO    WO 2014/095334 A1    6/2014

OTHER PUBLICATIONS

Acer, "AeroBlade™ 3D Fan Cooling Comes First," at least as early as Jan. 7, 2020, pp. 1-6, available at URL: https://www.acer.com/ac/en/US/content/acerdesign-aeroblade3d.

*Primary Examiner* — Moshe Wilensky
(74) *Attorney, Agent, or Firm* — Crowell & Moring LLP

(57) ABSTRACT

A system is for bonding a cover sheet to a core to form or repair a dual wall structure. The system includes a cover sheet probe and an inner pedestal probe. A three dimensional contoured tip of the cover sheet probe abuts against a three dimensional contoured outer surface of the cover sheet opposite a pedestal of the core. The pedestal abuts the inner surface of the cover sheet. The inner pedestal probe may be coupled to the core to create a conductive electrical path from the cover sheet probe through at least part of the structure. A flow of electric power is controlled and supplied to the cover sheet probe to heat a junction between the area of the cover sheet abutting the pedestal and the pedestal. A heated area is created in the junction and fixedly couples the coversheet and the pedestal.

15 Claims, 10 Drawing Sheets

(56) References Cited

U.S. PATENT DOCUMENTS

| | | |
|---|---|---|
| 9,566,660 B2 | 2/2017 | Holzhauer |
| 2015/0253288 A1 | 9/2015 | Spencer et al. |
| 2016/0251965 A1 | 9/2016 | Henderkott et al. |
| 2017/0211395 A1 | 7/2017 | Heffernan et al. |

BONDING SYSTEM FOR DUAL WALLED TURBINE COMPONENTS

CROSS REFERENCE TO RELATED APPLICATIONS

This application is a divisional application of, and claims priority under 35 USC § 120 to U.S. nonprovisional application 16/807,107, filed Mar. 2, 2020, the entire contents of which are incorporated by reference.

TECHNICAL FIELD

This disclosure relates to dual wall structures that have many applications. Specific applications disclosed relate to combustion turbines and, in particular, to complex geometry dual wall turbine component bonding.

BACKGROUND

Gas turbine engines generate large amounts of internal heat due to combustion processes. As a result, engine components, such as turbine blades, may experience high thermal loads. The use of dual walled structures in turbine engine components allows for higher operating temperatures.

Likewise, aircraft engines and aircraft themselves require low density, high strength structures, which are often created by using dual wall panels. The disclosed system and method can be used to create a wide variety of dual walled structures using many different materials. These dual walled structures have value for turbine engine components, aircraft components, and other industrial structures such as heat exchangers, cooled structures, low density rigid structures, reaction manifolding, and reaction plenums/chambers.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
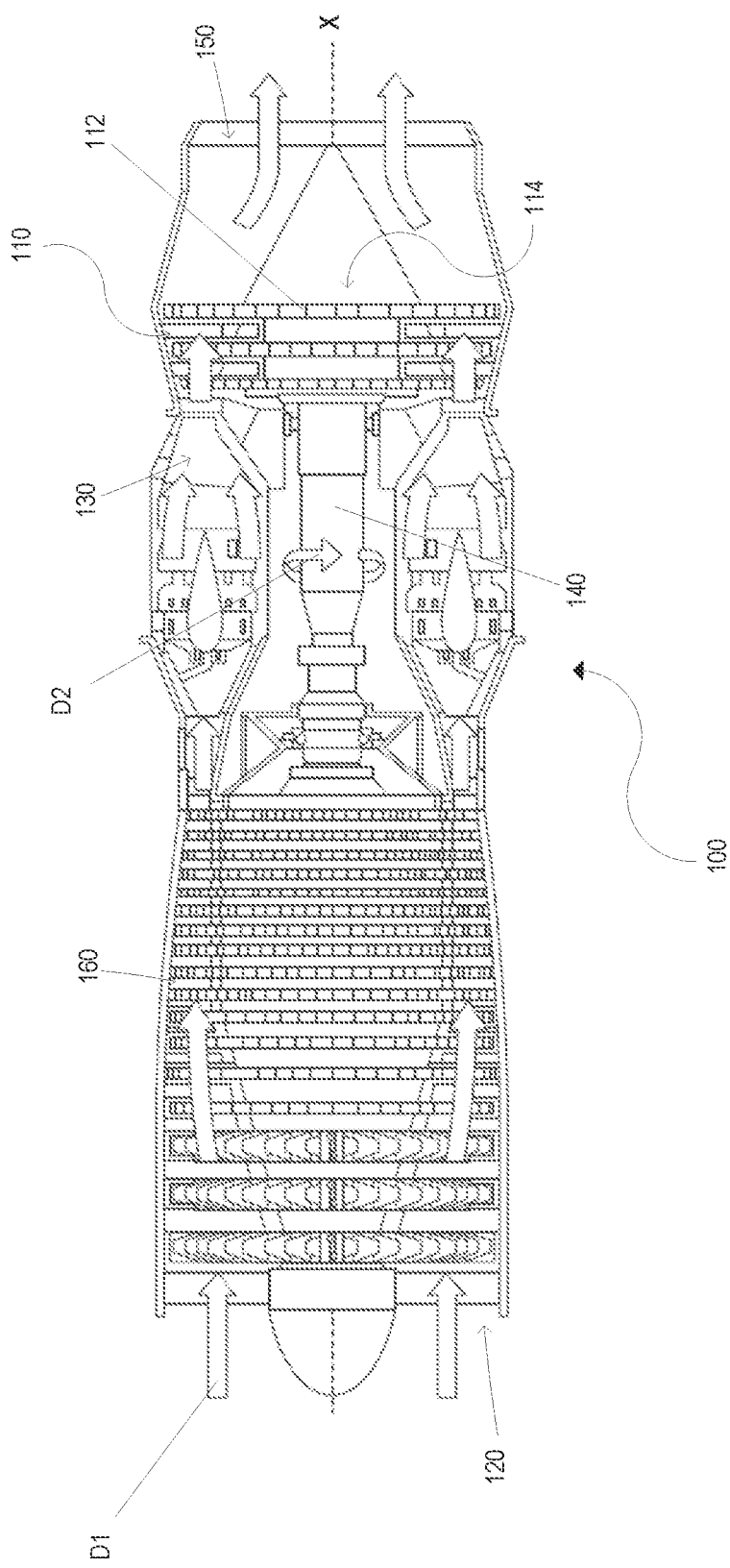
FIG. 1 is a cross-sectional view of an example of a gas turbine engine.

Described herein is a system for bonding dual wall structures such as turbine engine components, for example, blades, vanes, endwalls, and/or other similar components. A blade is disclosed to demonstrate the ability to create complex dual wall geometries. The system includes a resistance welder, a cover sheet probe, an inner pedestal probe, and an airfoil. The resistance welder is used for bonding, for example resistance bonding, diffusion bonding, and/or brazing/braze bonding. The dual walled turbine component includes a core and a cover sheet. The core may include a pedestal and/or a series of pedestals and other features. The cover sheet probe, the pedestal and inner and outer surfaces of the cover sheet may have highly contoured surfaces that align with each other. The highly contoured surfaces are three dimensional.

The highly contoured inner surface of the cover sheet abuts and follows the highly contoured surface of the pedestal. The cover sheet probe and the inner pedestal probe are electrically coupled to the resistance welder. The cover sheet probe may include a tip with a contacting area. The contacting area may have a three dimensional (3D) contoured surface that may match or follow the 3D contour of the outer surface of the cover sheet. The contacting area may abut against the outer surface of the cover sheet opposite the inner surface of the cover sheet abutting the pedestal. The contacting area may be equal to or greater than a surface area of the pedestal. A pressing force may be applied to the outer surface of the cover sheet by the tip of the cover sheet probe. The inner pedestal probe may be electrically coupled to the airfoil. A conductive electric path may be formed from the cover sheet probe to the inner pedestal probe through the airfoil. The conductive path may include at least part of the pedestal. The resistance welder may supply electric power to the cover sheet probe and form a heated area at the junction of the cover sheet and the pedestal.

An aspect of the system includes aligning a pedestal, and/or series of pedestals and other features, of the core of a dual wall structure, such as a turbine blade, with a cover sheet of the dual wall structure so that the cover sheet and pedestal are in contact with each other. A cover sheet probe is placed in contact with the cover sheet. A tip of the cover sheet probe may have a three dimensional contoured surface to follow and align with a three dimensional contoured portion of the cover sheet. An inner pedestal probe is placed on the dual wall turbine structure such that a conductive electric path is formed from the cover sheet probe to the inner pedestal probe through the cover sheet and pedestal of the dual wall structure. The cover sheet probe and inner pedestal probe apply a localized pressing force to the pedestal and the cover sheet. Electric power is applied along the conductive electric path to heat a junction between the cover sheet and pedestal. The flow of electricity generates heat which is used to form a metallurgical bond either by melting the interface thus creating a bond; diffusing the material of the components together to form a diffusion bond; or by using a preplaced interface material that either diffuses into both faces and creates a diffusion bond or melts and creates a braze joint. The heated junction may cool and fixedly join, or bond, the cover sheet to the core via the pedestal.

One unique feature of the system described below may be that localized bonding can take place. For example, individual pedestals may be locally bonded and/or defined groups or areas of pedestals may be locally bonded. The localized bonding allows for repair or rework to dual wall structures. The localized bonding process may allow for reduced manufacturing operation time and cost as compared to conventional methods such as brazing.

Another interesting feature of the system may be that the cover sheet probe may match and/or conform to the three dimensional contour of the outer surface of the cover sheet and/or pedestal so that a path of relatively lower resistance may be created between the cover sheet and the cover sheet probe. The contoured tip of the cover sheet probe and the pressing force applied by the cover sheet probe may help create a path of relatively lower resistance between the cover sheet and the cover sheet probe by increasing the conductivity between the cover sheet and cover sheet probe relative to a junction between the inner surface of the cover sheet and the pedestal. This may allow for the area of highest resistance between the cover sheet probe and the inner pedestal probe to be the area of contact between the cover sheet and the pedestal, creating a maximum temperature junction.

Another interesting feature may be that the inner pedestal probe is shaped so as to fit within specific areas of the dual wall structure, such as between the cover sheet and the core next to the pedestal. This way, predetermined areas of the airfoil can be bonded or repaired without affecting other areas of the structure.

FIG. 1 shows an example of a gas turbine engine 100. In some examples, the gas turbine engine 100 may be used for flight operations, for example to supply power to and/or provide propulsion of an aircraft. The term aircraft, for example, may include a helicopter, an airplane, a missile, an unmanned space vehicle, or any other similar device. Alternatively or in addition, the gas turbine engine 100 may be used in other vehicles or in an industrial application. Industrial applications may include, for example, an energy application, a power plant, a pumping set, a marine application, a weapon system, a security system, a perimeter defense or security system.

The gas turbine engine 100 may include an intake section 120, a compressor section 160, a combustion section 130, a turbine section 110, and an exhaust section 150. Operation of the gas turbine engine 100 may include receiving fluid, such as air, from the intake section 120. The fluid may travel along the direction D1. The fluid may travel from the intake section 120 to the compressor section 160, where the fluid is compressed. The compressed fluid may be mixed with fuel in the combustion section 130. The mixture of fuel and fluid may then be burned in the combustion section 130 creating combustion gases. The combustion gases, or combustion fluid, may then flow from the combustion section 130 to the turbine section 110 to extract energy from the combustion fluid. The energy from the combustion fluid may cause a shaft 140 of a turbine 114 in the turbine section 110 to rotate. The shaft 140 of the turbine 114 may in turn drive the compressor section 160. After passing through the turbine section 110, the combustion fluid may be discharged from the exhaust section 150.

During operation of the gas turbine engine 100, the fluid, such as air, may pass through the turbine section 110. The turbine section 110 may contain a plurality of adjacent gas turbine blades 112 coupled to a rotor disk. It is understood that gas turbine blades and vanes are often referred to as airfoils. In an example, the blades 112 may be bonded to the rotor disk to form a mechanically robust, monolithic component. The blades 112 may, alternatively, be fabricated separately from the rotor disc and the conventionally joined to the rotor disc. The blades 112 may be made of a rigid material, for example, the blades 112 may include a metal alloy. Alternatively, the blades 112 may include a heat resistant super alloy composition, for example, a nickel based or cobalt based composition. Alternatively, the blades 112 may include a ceramic material, such as a ceramic-matric composite (CMC) material. At least a portion of the blades may be formed, for example, through a casting process.

In the turbine section 110, the combustion fluid may pass between adjacent blades 112 of the turbine 114. The combustion fluid passing over the blades 112 may cause the turbine 114 to rotate. The rotating turbine 114 may turn the shaft 140 in a rotational direction D2, for example. The blades 112 may rotate around an axis of rotation, which may correspond to a centerline X of the turbine 114 in some examples. In addition, or alternatively, in other examples, the blades 112 may be part of a static vane assembly in the turbine section 110 of the gas turbine engine 100.

Figure 2:
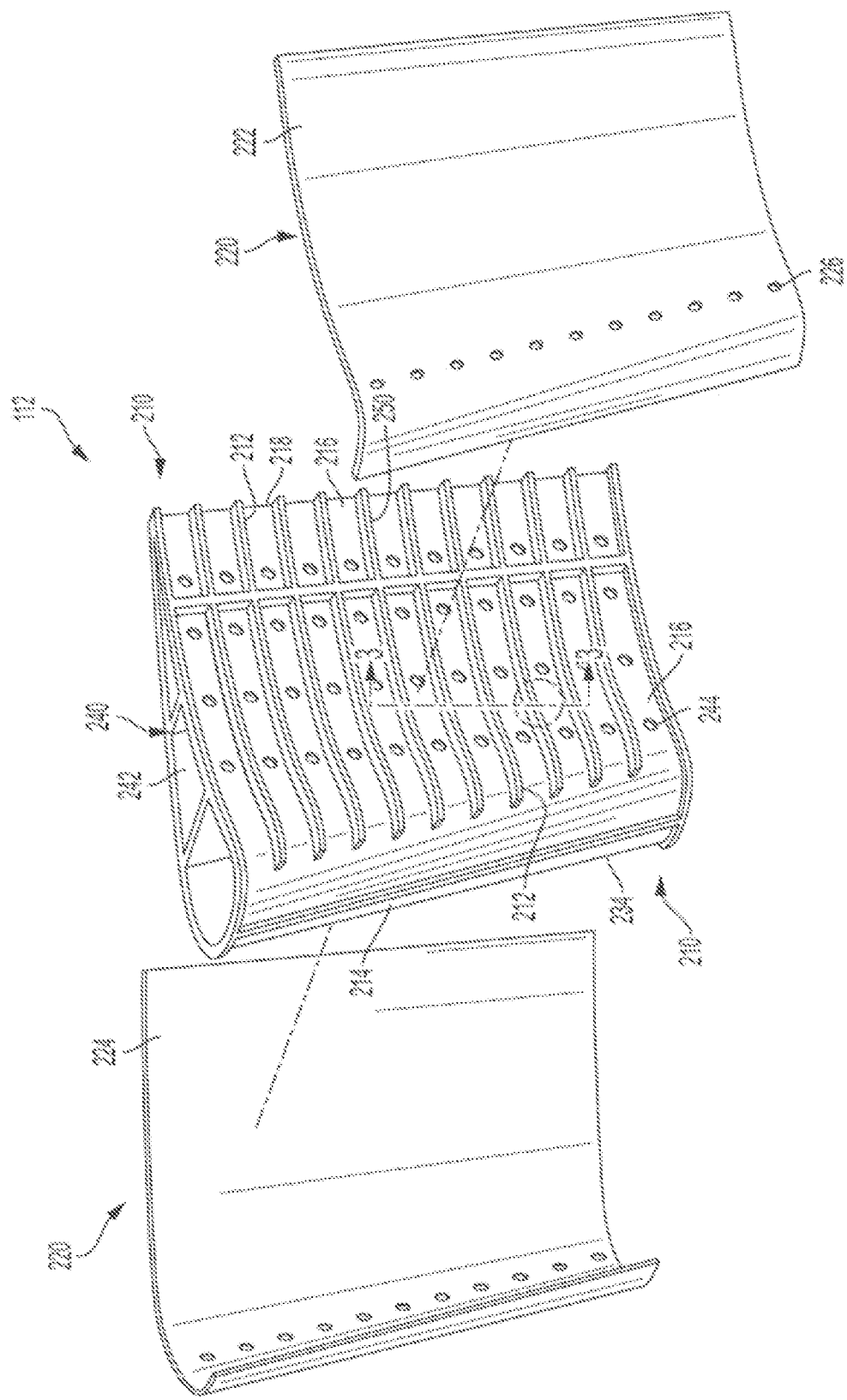
FIG. 2 illustrates an example of a portion of a three dimensional contoured dual wall structure.

FIG. 2 illustrates an example of three dimensional (3D) contoured dual walled airfoil structure in the form of a portion of blade 112 and/or vane. The features and functionality described with respect to FIG. 2 may also be typical of other dual walled structures having 3D contoured surfaces, such as other 3D contoured dual walled gas turbine engine components, so the description herein should not be construed as limited to turbine blades. The example blade 112 is illustrated as a dual wall turbine blade. The illustrated portion of the blade 112 includes a core 210 and a cover sheet 220. The cover sheet 220 and core 210 may form an airfoil of the blade 112 when bonded together. The core 210 and the cover sheet 220 may, for example, be metallurgically bonded as described herein. The core 210 and cover sheet 220 may be made of rigid materials, for example, a metal alloy. Alternatively, the core 210 and cover sheet 220 may comprise a heat resistant super alloy composition, for example, a nickel based or cobalt based composition. The core 210 and cover sheet 220 may be made of the same or different materials.

The blade 112 may have a highly contoured shape. For example, the blade 112 may be three dimensionally contoured. The core 210 and/or cover sheet 220 may have corresponding highly contoured surfaces, for example, predetermined three dimensional contoured surfaces in order to realize the desired shape of the blade 112. A three dimensional contoured surface refers to a surface defined by an X, Y, and Z axis. A three dimensional contoured surface is pre-defined by a cloud of points where in addition to surface variation of X and Y coordinates, Z coordinates may also vary from point to point of the three dimensional surface in order to form a predetermined three dimensioned contour. Thus, a three dimensional contoured surface may have a predetermined varying depth component (e.g. Z coordinates). In contrast, a two dimensional surface may be defined by only an X and Y axis because Z coordinates on the surface do not change or change only slightly with insignificant or minimal variation due to non-predefined distortions of the surface, such as surface roughness. A two dimensional surface may have a predetermined constant depth, or substantially constant predetermined depth that varies due to the presence of surface roughness. Thus, as described herein, predetermined three dimensionality of a contoured surface does not include surface roughness.

The core 210 may be formed, for example, through casting. The core 210 may have a discontinuous surface. The core 210 may include a leading edge 214, a trailing edge 218, a pressure side 234, and a suction side 232. The core 210 may be hollow and include a cooling channel 240 that extends through at least a portion of the length of the blade 112. In the illustrated example, the core 210 includes multiple cooling channels 240 in an airfoil core of the core 210. In other examples, additional or fewer cooling channels 240 may be present. The cooling channels 240 may be defined by one or more interior walls 242 of the core 210. The cooling channels 240 may be supplied with fluid, such as secondary air provided by the gas turbine engine. The core 210 may include one or more pedestals 212. The pedestal 212 may be a raised surface feature of the core 210. The pedestals 212 may be raised from the interior wall 242 of the core 210. The pedestals 212 may be raised from the opposite surface of the interior wall 242 with respect to the cooling channel 240 so as to extend away from the interior wall 242.

FIG. 2 and the discussion herein focuses on bonding the cover sheet 220 and the pedestal(s) 212 using the system and methods described. Alternatively, or in addition, the bonding performed as discussed and described herein may occur between the pedestal(s) 212 and the core 210. Thus, in some examples, the pedestals 212 may be coupled with the core 210 or the cover sheet 220 by other than operation of the system. For example, the pedestals 212 may be integrally formed with the core 210 such as by casting, additive manufacture, bonding, or other joining techniques of the core 210 and the pedestals 212 to provide a relatively low resistance junction, or no junction, between a respective pedestal 212 and the core 210 resulting in a highly conductive path for electric current. In alternative examples, the bonding performed with the system as discussed and described herein may be between the three dimensional contoured surface(s) of the pedestal(s) 212 and the core 210, and the bonding of the pedestal(s) 212 and the cover sheet 220 may also be accomplished to form the relatively low resistance junction, or no junction, between the cover sheet 220 and the pedestal(s) 212. An advantage of omitting the bond between the pedestals 212 and the cover sheet 220, for example, when the dual walled structure is used as a turbine blade or vane, is to avoid placing a bond created by the system in a region that experiences higher heat during the operation of a turbine engine. It should nevertheless be understood that bonding of the three dimensional highly contoured surface of the pedestal(s) 212 to the cover sheet 220, the core 210, or both, may be performed as described herein.

The core 210 may include one or more pedestals 212, for example, the core 210 may include approximately 1,000 pedestals on each side of the core 210. The pedestals 212 may constitute surface regions of the discontinuous surface of the core 210. The core 210 may include flow channels 216. The flow channels 216 may be adjacent to the pedestals 212, such that the pedestals 212 separate the flow channels 216. The flow channels 216 may be positioned between the core 210 and the cover sheet 220 when the core 210 and cover sheet 220 are bonded together. The flow channels 216 may be sealed when the core 210 and cover sheet 220 are bonded together, thus enabling the ability of guiding fluid through a predesignated circuitous path. Fluid, such as air, may flow through the flow channels 216 of the core 210.

The core 210 may include a network of pedestals 212 and flow channels 216. The pedestals 212 and the flow channels 216 may form one or more patterns of the pedestals 212 on the core 210. The interior wall 242 may include inlet ports 244 that penetrate the interior wall 242. The flow channels 216 may be in fluid communication with the cooling channel 240 via the inlet ports 244. The pedestals 212 and the flow channels 216 may be formed, for example, through a casting process. Alternatively or in addition, the pedestals 212 and the flow channels 216 may be formed, for example, through a machining process.

The arrangement of pedestals 212 and flow channels 216 shown in FIG. 2 is only one example of a possible configuration, and is not intended to be limiting. The pedestals 212 and the flow channels 216 may form straight, linear paths with sharp angles. Alternatively, the pedestals 212 and flow channels 216 my form curved, nonlinear paths.

The pedestals 212 may vary in shape. The pedestals 212 may be elongated such that the pedestals 212 continuously extend from the trailing edge 218 to the leading edge 214 of the core 210 to form the flow channels 216 there between. For example, the pedestals 212 may each be in the shape of a raised rib or rectangle shaped platform. Additionally or alternatively, the pedestals 212 may be in any intermixed arrangement of shapes and/or patterns to achieve the functional results desired of the final component design In one example, each rectangular pedestal 212 may continuously extend horizontally across the surface of the core 210, between the leading edge 214 and the trailing edge 218. For example, the pedestals 212 may be positioned parallel to each other and be spaced a predetermined distance from each other. The spacing between the parallel pedestals 212 may be the same. Alternatively the pedestal 212 may extend in differed directions with respect to each other and/or be variably spaced from each other to form the flow channels 216. Alternatively or additionally, the pedestals 212 may continuously extend vertically from the radially outward end of the core 210 to the radially inward end of the core 210. The vertically extending pedestal 212 may cross or connect with one more pedestals 212 extending horizontally 212.

The pedestals 212 may connect to each other, that is, one pedestal 212 may connect to an adjacent pedestal 212. The pedestals 212 may be shapes, for example circles or squares, that do not connect to each other, that is one pedestal 212 does not contact another pedestal 212 to provide a flow channel 216 there between. The distance between the pedestals 212 or the spacing of the pedestals 212 from each other may form a pattern of the pedestals 212 on the core 210. The pattern may include pedestals 212 uniformly spaced from each other to form a repetitive pattern, or pedestals 212 with varying spacing from each other. Additionally or alternatively, the pattern may include pedestals 212 of uniform or varying shapes.

The pedestals 212 may include a surface area 250 disposed towards the cover sheet 220. The surface area 250 of the pedestals 212 may be a continuously connected surface area 250 of multiple pedestals 212 in example configurations where one pedestal 212 is connected to another pedestal 212. The surface area 250 may abut an inner surface 224 of the cover sheet 220. The surface area 250 may be the surface of the pedestals 212 opposite the end of the pedestal 212 abutting the interior wall 242 of the core 210. The surface area 250 may be planar. Alternatively, the surface area 250 of the pedestals 212 may be contoured.

The surface area 250 of the pedestals 212 may be uniform or may be variable to align with an interior surface of the coversheet 220 for purposes of bonding at least some of the pedestals 212 to the coversheet 220. The surface area 250 may conform to the cover sheet 220. For example, the cover sheet 220 and the surface area 250 may be curved with a predetermined mathematically defined curvature such that the suction side 232 and/or the pressure side 234 of the airfoil is formed by the cover sheet 220 when bonded to the core 210. The surface area 250 of the pedestal 212 may match the corresponding mathematically defined curvature of the surface of the cover sheet 220 such that the cover sheet 220 maintains the predetermined shape when bonded to the pedestal 212, or the cover sheet 220 assumes the predetermined mathematically defined curvature when bonded to the pedestal 212. Accordingly, the surface areas 250 may be one or more predetermined shapes or configurations to achieve desired bonding. The surface area 250 of the pedestal 212 may be highly contoured. For example, the surface area 250 may be a three dimensional contoured surface formed with predetermined X, Y and Z coordinates. The 3D contour of the surface area 250 may correspond with the 3D contour of an area of cover sheet 220 that the surface area 250 contacts. The three dimensional contour of each of the surface areas 250 may differ and/or be unique. The cover sheet 220 may be three dimensionally contoured such that the surface area 250 of each pedestal 212 varies and/or is different among different pedestals 212. In other words, the three dimensional contoured inner surface of the cover sheet 220 and the three dimensional contoured surface of the pedestal 210 may provide uniform intimate contiguous contact therebetween. Alternatively or in addition, as discussed herein, the bonding of three dimensional contoured surfaces may occur between the pedestal(s) 212 and the core 210.

The cover sheet 220 may include an outer surface 222 and the inner surface 224. The inner surface 224 may be the surface of the cover sheet 220 disposed towards the core 210. The inner surface 224 of the cover sheet 220 may abut the pedestals 212. The inner surface 224 may be coupled to pedestals 212 when the cover sheet 220 is bonded with the core 210 and/or the pedestals 212. The cover sheet 220 may be metallurgically bonded to the pedestals 212 as described herein. The cover sheet 220 may be bonded to the pedestals 212 at the surface area 250. The cover sheet 220 may be bonded to the core 210 such that the cover sheet 220 covers the pedestals 212 and flow channels 216. The cover sheet 220 may create a fluid tight seal with the pedestals 212 such that fluid flows through the flow channels 216 of the core 210. The cover sheet 220 may form a continuous outer layer of at least part of the blade 112. Additionally, an area of the cover sheet 220 may be bonded to another area of the cover sheet 220. For example, the cover sheet 220 may be bonded to itself at the leading edge 214 and/or the trailing edge 218 of the core 210. The outer surface 222 may be the surface of the cover sheet 220 opposite the inner surface 224. The outer surface 222 and/or inner surface 224 may be planar or contoured. For example, the outer surface 222 and/or inner surface 224 may be a three dimensional contoured surface. The three dimensional contour of the outer surface 222 and the three dimensional contour of the inner surface 224 may be oppositely contoured surfaces, whereas a convex outer surface and a concave inner surface are oppositely contoured surfaces. For example, a portion of a sheet with a convex outer surface would have a corresponding, oppositely contoured concave inner surface. The cover sheet 220 may include outlet ports 226 that penetrate the cover sheet. Fluid, such as air, may discharge from the flow channels 216 via the outlet ports 226 and into the turbine section 110 (FIG. 1).

Figure 3:
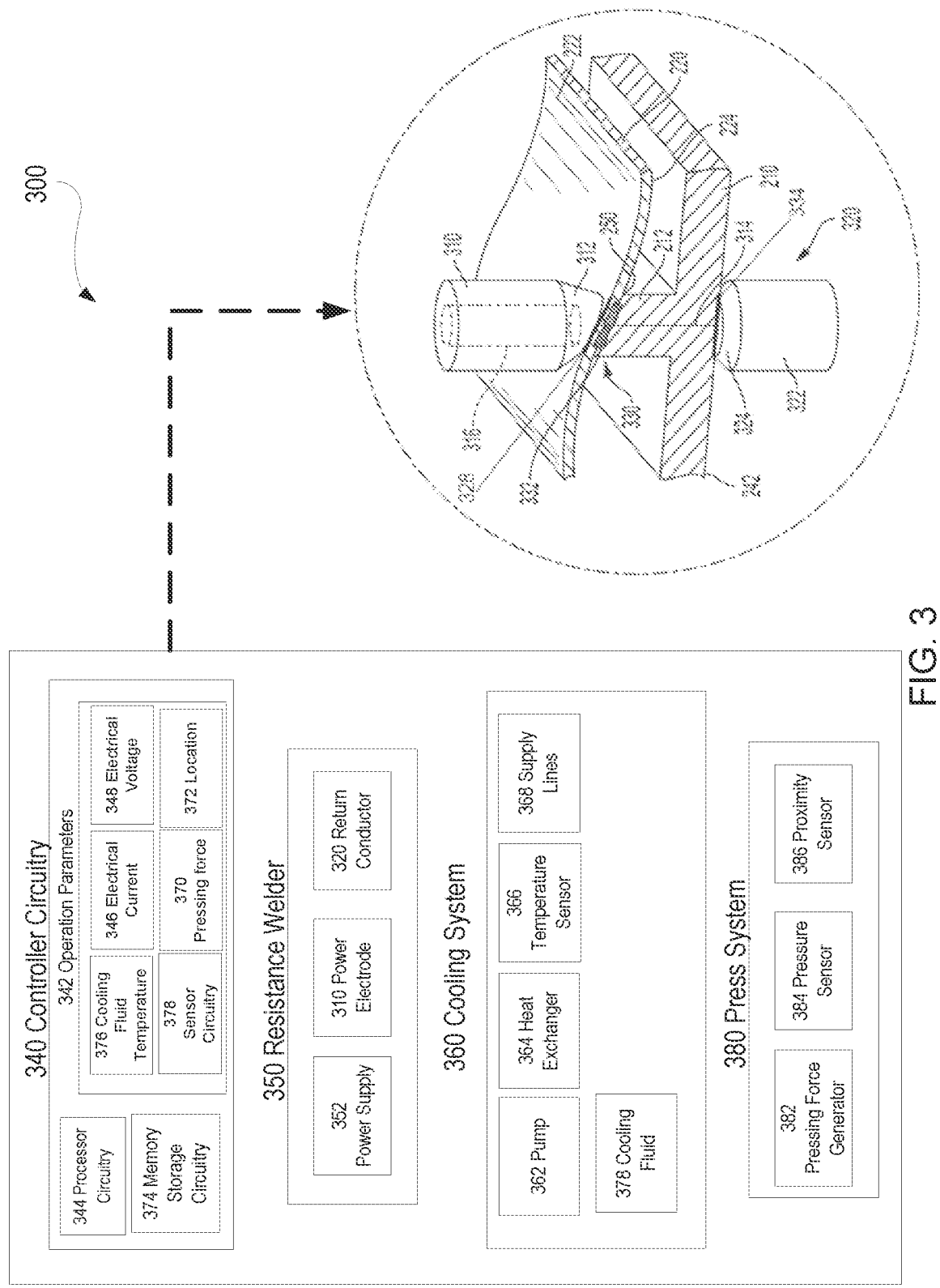
FIG. 3 illustrates an example of a bonding system.

FIG. 3 illustrates an example of a bonding system 300. The bonding system 300 may include controller circuitry 340, a resistance welder 350, a cooling system 360, and a press system 380. The resistance welder may be used for bonding, for example resistance bonding, diffusion bonding, or braze bonding/brazing. A resistance bond may result in, for example a resistant weld or weld nugget. The resistance welder 350 may include a power supply 352, a cover sheet probe 310, and a inner pedestal probe 320. The resistance welder 350 may be electrically coupled to the cover sheet probe 310 and the inner pedestal probe 320. The resistance welder 350 and the press system 380 may cooperatively operate in combination with the controller circuitry 340 and/or the cooling system 360. The cover sheet probe 310 may include a tip 312 and the inner pedestal probe 320 may include a sink electrode 322 having a tip 324.

The cover sheet probe 310 may be, for example, a source electrode or a supply electrode configured to supply a voltage and current. The inner pedestal probe 320 may be electrically coupled to the sink electrode 322. Alternatively, the inner pedestal probe 320 may be some other form of connection to the core 210, for example, a clamp. The tip 312 of the cover sheet probe 310 and the tip 324 of the sink electrode 322 of the inner pedestal probe 320 may be made out of a conductive material, for example an alloy. The alloy, for example, may include one or more of copper, cobalt, tungsten, nickel, or another similar material to, for example, tailor a balance between thermal conductivity and compliance/creep. The tip 312 of the cover sheet probe 310 and the tip 324 of the inner pedestal probe 320 may be made of the same or different materials. The parameters used for conducting the process may be adjusted to produce the type of bond desired (e.g. resistance bond, braze bond, or diffusion bond). The controller circuitry 340 may control operation parameters 342 of the bonding system 300. The operation parameters 342 control the bonding process. The operation parameters 342 may, for example, include pressing force 370, location 372, electrical current 346, electrical voltage 348, cooling fluid temperature 376, sensor circuitry 378 and/or any other operational parameters used to control the bonding process. The operation parameters 342 may include hardware or some combination of hardware and software to perform the described functions. For example, the controller 340 may control the voltage and current levels of electrical power supplied by the resistance welder 350 to the cover sheet probe 310 In this example, the controller 340 may control the electrical current 346 and/or the electrical voltage 348 supplied to the cover sheet probe 310 based on predetermined settings, user entered values, or sensed feedback provided from the sensor circuitry 378. The operation parameters 342 may vary depending on the operation, but may, for example, be set to a pressing force 370 of 1779.29 Newtons, a specific pedestal location 372, an electrical current 346 of 1630 Amps, and a cooling fluid temperature 376 of room temperature. The pressure and temperature sensor circuitry 378 and/or any other operational parameters may also be used to control the bonding process. The resistance welder 350 may, for example, be a Miyachi Unitek 875 Dual Pulse Stored Energy Power Supply. Parameters of the resistance welder 350 may vary depending on the materials, conditions, operation, and other variables, but may, for example, be set to the parameters in Table 1.

TABLE 1

| Squeeze | Force | Preheat | Preheat Time | Start Up-Slope | Up-Slope Time | Bonding Current | BondingTime |
|---|---|---|---|---|---|---|---|
| 90 cycles | 1779.29N | 30% | 60-90 cycles | 30% | 60 cycles | 50-70% | 30-60 cycles |

The controller circuitry 340 may include at least one processor circuitry 344 in communication with memory storage circuitry 374. At least some of the functionality of the controller circuitry 340 as described herein may be performed with the processor circuitry 344. For example, the processor circuitry 344 may access and store predetermined settings for at least some of the operation parameters 342 in memory storage circuitry 374. In addition, or alternatively, other functionality of the bonding system 300 may be provided by other parts of the controller circuitry 340. For example, the controller circuitry 340 may control the magnitude of voltage and a flow of current through the cover sheet probe 310 and the inner pedestal probe 320. The controller circuitry 340, for example, may control the supply of voltage and current to the cover sheet probe 310 such that an intermittent pulse of electric power is supplied to the cover sheet probe 310 The duration and magnitude of the intermittent pulse of electric power may be controlled by the controller circuitry 340. A practical application of this capability, for example, is interpreting Non-Destructive Testing (NDT) or Non-Destructive Evaluation (NDE) data to determine the number of pedestals or area requiring bonding repair and selecting the appropriate cover sheet probe 310 based on this data and the associated present bonding parameters 342. Portions of the cover sheet 220 that abut a pedestal 212 and/or each pedestal 212 may have a unique predetermined three dimensional contoured surface. Each portion, area, or sub-area of the three dimensional contour of the cover sheet 220 and/or pedestal 212 may correspond to a specific cover sheet probe 310 Alternatively, or in addition, each portion area, or sub-area of the three dimensional contour of the of the cover sheet 220 and/or each pedestal 212 may correspond to only one cover sheet probe 212. Thus, in some examples, the three dimensional contour of each cover sheet probe 212 may correspond to only one pedestal 212 or portion of the cover sheet 220. The system 300 may choose the correct cover sheet probe 212 and/or set the parameters for completion of bonding based on the area or sub-area needing repair.

The sensor circuitry 378 may receive and process electric signals from external sensors, such as current, voltage, pressure, temperature, and proximity sensors providing electric signals indicative of the respective sensed parameters to the controller circuitry 340 via the sensor circuitry 378. Alternatively or additionally, the sensor circuitry 378 may receive and process signals from externally processed data such as (NDT/NDE) sensors or results. The sensed parameters may be used by the controller circuitry 340 to control the bonding system 300 in the manner described.

The sensors may detect resistance, current, bonding pressure, and temperature, which may be provided as feedback and/or feed forward and/or monitoring signals to the controller circuitry 340. Based on the sensed signals from the sensors, the controller circuitry 340 may provide close-loop adjusted parameters.

The tip 312 of the cover sheet probe 310 may be placed in contact with the outer surface 222 of the cover sheet 220. For example, the tip 312 may abut the outer surface 222 of the cover sheet 220. The tip 312 of the cover sheet probe 310 may be three dimensionally contoured to follow or match a portion of the three dimensional contoured outer surface 222 of the cover sheet 220. Additionally the tip 312 may be three dimensionally contoured to follow the 3D contoured surface area 250 of the pedestal 212 in contact with the 3D contoured inner surface 224 of the cover sheet 220. For example, the three dimensional contoured surface of the tip 312 may have the same three dimensional contour of the inner surface 224 of the cover sheet 220. Additionally or alternatively, the outer surface 222 of the cover sheet 220 may have the same three dimensional contour as the surface 250 of the pedestal 212. As the inner surface 224 and the outer surface 222 of the cover sheet 220 may be oppositely contoured, the surface 250 of the pedestal 212 and the tip 312 may be oppositely contoured such that the outer surface 222, inner surface 224, pedestal 212, and tip 312 all have matching three dimensionally contoured surfaces. The matching three dimensional contoured surfaces of the tip 312, outer surface 222 of the cover sheet 220, the inner surface 224 of the cover sheet 220, and the pedestal may create a path of lower relative resistance at a first junction 328 between the tip 312 and the outer surface 222 than at a second junction 330 of the inner surface 224 and the surface area 250 of the pedestal 212.

The three dimensional contour of the tip 312 may allow for the distance between tip 312 of the cover sheet probe 310 and the outer surface 222 to remain constant along the first junction. The distance between the inner surface 224 of the cover sheet 220 and the surface area 250 of the pedestal 212 along the second junction may be larger than the distance of the first junction 328. Alternatively or additionally, tip 312 of the cover sheet probe 310 and/or the tip 324 of the inner pedestal probe 320 may be made of different material(s) than the cover sheet 220 and/or core 210. The material(s) of the tips 312 and/or 324 may have a higher conductivity than the material(s) of the core 210 and/or cover sheet 220 of the blade 112. For example, the tips 312 and/or 342 may be made of copper, or another similar material, and provide a lower resistance than the material(s) of the core 210 and/or cover sheet 220, for example a nickel or cobalt based super alloy. The material(s) of the tips 312/324 may also conform to a contacting surface better than the material(s) of the core 210 and/or cover sheet 220. Because of the material difference between the tip(s) and the blade 112 and/or because the distance may be larger between the inner surface 224 and the pedestal 212 than the between the tip 312 and the outer surface 222, the resistance along a conductive electrical path 314 may be highest at the second junction 330. Thus, the second junction 330 may be a localized maximum temperature junction of the conductive electric path 314, by design.

The tip 312 of the cover sheet probe 310 may include a surface area footprint that corresponds to the surface area footprint of the pedestal 212 on the opposite side of the cover sheet 220 from the tip 312. Thus, for example, a square or circular shaped footprint of a 3D contoured surface of the tip 312 may correspond in shape to a square or circular shaped footprint of a 3D contoured surface of a pedestal. In addition, or alternatively, the surface area footprint of the tip 312 contacting the outer surface 222 of the cover sheet 220 may be equal to or greater than a surface area footprint of the pedestal 212 contacting the inner surface 224 of the cover sheet 220. Thus, for example if the tip 312 of the cover sheet probe 310 includes a 3D contoured surface of a 3.175 mm square, or an area of 10.08 square mm, the 3D contoured surface of the pedestal 212 contacting the inner surface 224 of the cover sheet 220 is equal to or less than 10.08 square mm. In an example, the surface area of the tip 312 may be larger than the surface area of a pedestal 212 such the 3D contoured surface of the tip 312 extends beyond one or more peripheral edges of the pedestal 212 by up to 30% of the total distance between the pedestal 212 and neighboring pedestals. Because the surface area of the tip 312 is larger than the surface area of the pedestal 212, there may be less resistance between the tip 312 and the outer surface 222 of the cover sheet 220 than between the inner surface 224 of the cover sheet 220 and the pedestal 212. This may contribute to the resistance along the conductive electrical path 314 being highest at the second junction 330. Alternatively or in addition, as discussed herein, the bonding of three dimensional contoured surfaces may occur between the pedestal(s)

212 and the core 210, wherein the highest resistance along the conductive electrical path 314 is between the pedestal 212 and the core 210.

The tip 324 of the sink electrode 322 of the inner pedestal probe 320 may be in contact with a part of the dual wall turbine blade 112 such as the core 210. For example, the tip 324 of the inner pedestal probe 320 may abut a surface of the core 210, such as against one or more of the pedestals 212. Alternatively, the tip 324 may abut the interior wall 242. The tip 312 of the cover sheet probe 310 may abut the cover sheet 220 opposite an area where one of more of the pedestals 212 abuts the inner surface 224 of the cover sheet 220. The controller circuitry 340 may control the press system 380 using the tips 312 and 324 to exert the pressing force 370 against the cover sheet 220 and the dual wall turbine blade 112, respectively. The pressing force 370, for example, may be predetermined, user entered or based on parameters sensed by external sensors. The pressing force 370, for example, may be localized to one predetermined area of the airfoil without applying force to other areas of the airfoil. The cover sheet 220 may be temporarily affixed to the dual wall turbine blade 112 by the pressing force 370 or some other retention process. The cover sheet 220 may be affixed to the dual wall turbine blade in a predetermined location or positioned in preparation for bonding.

The tip 312 of the cover sheet probe 310 and the tip 324 of the inner pedestal probe 320, when contacting the cover sheet 220 and core 210 respectively, may create a conductive electrical path 314. Electricity may flow along the conductive electrical path 314 from the cover sheet probe 310 to the inner pedestal probe 320. Electricity may flow along the conductive electrical path 314 through at least part of the dual wall structure 112. Electricity may flow along the conductive electrical path 314 through at least part of the pedestal 212. Electricity may flow through the cover sheet 220 and the core 210. The flow of electricity may heat the second junction 330 between the cover sheet 220 and the pedestal 212. The second junction 330, for example, may be created between the cover sheet 220 and one or more pedestals 212. The heat generated by resistance in the second junction 330 to the flow of electricity may create a heated area 332 at the second junction 330. The heated area 332 may cool and fixedly couple the cover sheet 220 and core 210. The heated area 332 may cool to form, for example, a resistance bond or a spot bond. A resistance bond may be, for example a resistance weld. A spot bond may be, for example, a spot weld. The bonding, for example, may be localized. The heated area 332 may cool to form, for example, a bond nugget, for example, a weld nugget. The bonding may be localized to the predetermined surface area 250 (FIG. 2) of one or more of the pedestals 212. Alternatively or in addition, as discussed herein, the bonding of three dimensional contoured surfaces may occur between the pedestal(s) 212 and the core 210.

Additionally, the inner pedestal probe 320 may contact the core 210 at a third junction 334 with a predetermined contact surface area. A ratio of the contact surface areas of the third junction 334 (between the inner pedestal probe 320 and the core 210) and the first junction 328 (between the cover sheet probe 310 and the outer surface 224 of the cover sheet 220) may be predetermined. For example, the inner pedestal probe 320 may contact a larger surface area of the blade 112 than the cover sheet probe 310 By having a larger contact surface area, the third junction 334 may have a lower relative resistance than other junctions along the conductive electrical path 314. The contact ratio may allow for a maximum temperature junction along the conductive electrical path 314 to be at the second junction 330 between the inner surface 224 of the coversheet 220 and the pedestal 212. Alternatively or additionally, the second junction 330 may be a maximum temperature junction as compared to the first junction 328 or third junction 334 of a respective pedestal 212 corresponding area of cover sheet 220. The first junction 330, second junction 330, and third junction 334 may be along the conductive electrical path 413.

The cooling system 360 may include one or more pumps 362, a heat exchanger 364, a temperature sensor 366, and supply lines 368. The cooling system 360 may circulate a cooling fluid 378. The cover sheet probe 310 may include a cooling passageway 316. The cooling passageway 316 may extend through the cover sheet probe 310 The cooling passageway 316, for example, may extend through the tip 312 of the cover sheet probe 310 The supply lines 368 may couple to the cooling passageway 316 such that cooling fluid may be circulated through the cover sheet probe 310 and/or the tip 312 of the cover sheet probe 310 The cooling fluid 378 may flow through the supply lines 368 to the cover sheet probe 310 The cooling fluid 378 may cool the cover sheet probe 310 and by circulating through the cover sheet probe 310 and return to the heat exchanger 364. The returning cooling fluid 378 may be cooled by the heat exchanger 364 and then again be circulated through the cover sheet probe 310 The flow of the cooling fluid 378 may be driven by one or more pumps 362 included in the cooling system 360. The temperature sensor 366 may one or more temperature sensors disposed to sense the temperature of the cooling fluid 378 circulating in the cooling system 360, such as for example in the flow path before or after the cover sheet probe 310 The temperature sensor 366 may sense the temperature of the cooling fluid 378 being supplied to and/or received from the cover sheet probe 310 The controller circuitry 340 may increase, decrease, or maintain constant the cooling of the cover sheet probe 310 using the cooling system 360 based on feedback from the temperature sensor 366. For example, the controller 340 may increase or decrease the flow of the cooling fluid 378 by controlling flow rate with the one or more pumps 362. Alternatively, or additionally, the controller 340 may increase or decrease the rate at which the cooling fluid 378 is cooled by the heat exchanger 364.

The press system 380 may include a pressing force generator 382, one or more pressure sensors 384, and one or more proximity sensors 386. The proximity sensor 386 may be used by the press system 380 to locate or otherwise position the cover sheet probe 310 in a predetermined area of the cover sheet 220. One application of this, for example, is in the form of interpreting NDT and/or NDE data and locating a specific cover sheet probe 310 or bank of cover sheet probes 310 Another application, for example, may be operational sequencing of bank cover sheet probes 310 to successfully manufacture a highly contoured component. Additionally, the proximity sensor 386 may be used to locate the inner pedestal probe 320 to a predetermined area of the core 210. For example, the proximity sensors 386 may be used to locate the inner pedestal probe 320 to one of the pedestals 212 and the cover sheet probe 310 to an area of the cover sheet 220 in contact with the corresponding pedestal 212. The pressing force generator 382 may generate a predetermined amount of force to be applied by the cover sheet probe 310 to the cover sheet 220. For example, the cover sheet probe 310 may apply a predetermined force, measured in Newtons, to the cover sheet in a predetermined direction, such as perpendicular to the outer surface of the cover sheet. For example, an example of this is interpretation of NDT and/or NDE results and selecting a proper cover sheet probe 310 from a bank of cover sheet probes 310 and setting the force appropriately. Another example is proper sequencing of bank cover sheet probes 310 and adjusting the pressure and parameters based on the specific cover sheet probe 310 required to manufacture a highly contoured 3D component.

In one example, the bonding system 300 may include a two-axis X-Y stage with a servo control system built to locate defect areas for resistance bonding repair. The bonding system 300 may have a machine accuracy of 0.00508 mm and a travel distance of 60.96 cm×101.6 cm. The X-Y-Z system may be integrated with resistance bonding system and with the NDE/NDT system, inspection of images, and digital data.

The pressing force generator 382 may generate a corresponding pressing force. The pressure sensors 384 may be used to detect to a magnitude of force being applied to the cover sheet 220 by the press system 380. Feedback from the pressure sensors 384 may be used by the bonding system 300 to adjust the amount of force generated by the pressing force generator 382. The applied force may create an electric conductive path of relatively less resistance between the probe 310 and the cover sheet 220. One interesting feature of the bonding system 300, for example, is that the system 300 may use resistance pre-heating and long post-bonding hold time, with a coversheet probe 310 having a predetermined 3D contoured surface design, and plated bonding interfaces.

The press system 380 may be controlled to balance heating of the heated area with cooling of the tip 312 of the cover sheet probe 310 to avoid indentation of the cover sheet 220 due to excessive temperature of the tip 312 in combination with the contacting pressure being asserted on the cover sheet 220. For a given part there may be multiple unique probes 310, the control system may perform selection of the cover sheet probe 310 selection based on NDT, NDE, and/or other sequencing input, select the correct probe 310 and select the proper parameters based on the probe 310 and results that are trying to be achieved.

All features and functionality discussed with reference to FIGS. 1-3 are applicable to the following embodiments and examples unless otherwise indicated.

Figure 4:
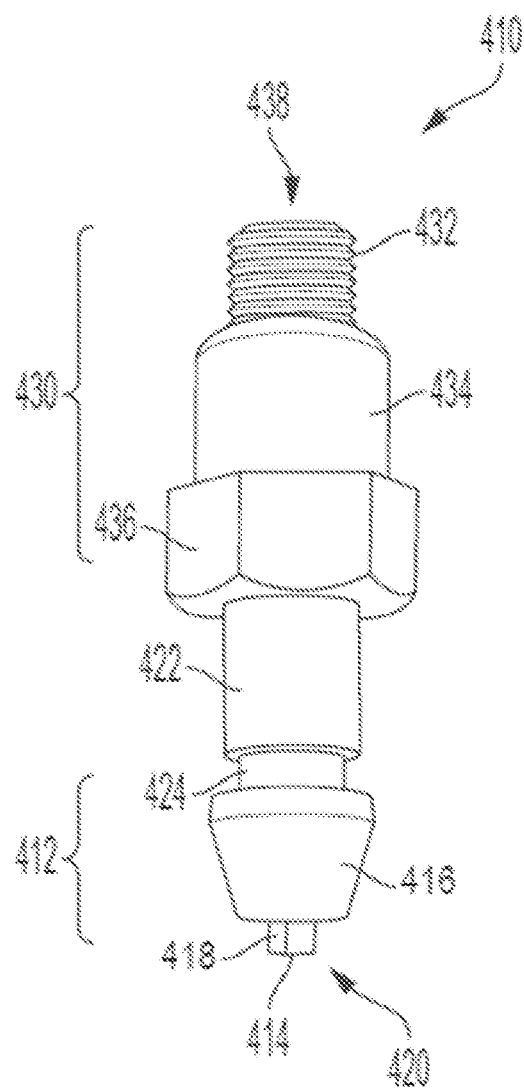
FIG. 4 illustrates an example of a probe.
Figure 5:
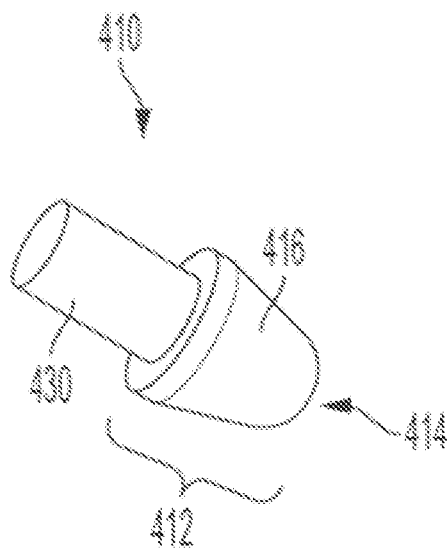
FIG. 5 illustrates another example of a probe.

FIGS. 4 and 5 illustrate examples of a probe 410. The probe 410 may be one example of the cover sheet probes 310 of the bonding system 300 (FIG. 3). The probe 410 may, alternatively or additionally, be an example of one or more of the inner pedestal probes 320 of the bonding system 300 (FIG. 3). The probe 410 may include a tip 412. The tip 412 may be one example of tip 312 (FIG. 3.) Thus, for brevity, the discussion with respect to FIGS. 2-3 will not be repeated and it should be understood that all described features and functionality are applicable to FIGS. 4 and 5 unless otherwise indicated. The tip 412 may include a contacting area 414. The tip 412 and/or the contacting area 414 may be three dimensionally contoured to correspond to the three dimensional contoured surface area 250 of one or more of the pedestals 212 (FIG. 2). Alternatively or additionally, the tip 412 and/or the contacting area 414 may be three dimensionally contoured to match the surface area 250 of one or more of the pedestals 212. Alternatively or additionally, the tip 412 and/or the contacting area 414 may be three dimensionally contoured to match the three dimensional contour of the outer surface 222 of the cover sheet 220 (FIG. 2). The cover sheet probes 310 and the inner pedestal probe 320 may have the same or different shapes and/or contours. Alternatively or additionally, the probe 410 of the inner pedestal probe 320 may be shaped, for example, such that the inner pedestal probe 320 can access and contact a predetermined area of the core 210. For, example, the sink electrode 322 and inner pedestal probe 320 may be shaped such that the sink electrode 322 and/or inner pedestal probe 320 can access the cooling channel 240 and/or area of the interior wall 242. The sink electrode 322 and/or inner pedestal probe 320 may be shaped, for example, such that the sink electrode 322 and/or inner pedestal probe 320 can access the core 210 already bonded to the cover sheet 220. The three dimensional contour and conformity of the tip 412, and the parameters 342 of the bonding system 300, are chosen to balance the cooling aspect and tip compliance such that deformation of the coversheet 220 is minimized or absent. Cover sheet deformation results in stress risers that can initiate cracks. The probe tips 412 may be manufactured, for example, by brazing, diffusion bonding, and/or ALM such that cooling liquid can flow into the distal tips 412 of the shaped probe 410 to maximize cooling. The shaped probes 410 allow power selection of the bonding system 300 to balance probe compliance and cover sheet deformation to minimize or eliminate cover sheet deformation. The probes 412 may be designed based on the NDT and/or NDE inspection results of defects to perform this repair in automated settings. The software that controls the system may be linked to code, in one example, code written in Labview, to link data coming from ultrasonic and/or other operations related to the NDE and/or NDT.

The surface area 250 and/or the outer surface 222 may be matched to allow for better surface contact and therefore conductivity between the surface area 250 and the probe 410 and/or the outer surface 222 and the probe 410. Contouring to match the tip 412 with the surface of the cover sheet 220 may create a relatively low resistance conductive electrical path between the tip 412 of the probe 410 and the outer surface 222 of the cover sheet 220. The conductive electrical path at the first junction 328, between the tip 412 and the outer surface 222, may be relatively low resistance with respect to the resistance of the conductive electrical path at the second junction 330 of the inner surface 224 and one of the pedestals 212. The highest resistance along conductive electric path 314 (FIG. 3) may be at the second junction 330. The magnitude of the pressing force 370 may also lower the resistance between the tip 412 and/or contacting area 420 and the outer surface 222. The probe 410 may allow localized bonding. For example, the bonding may be welding, such as resistance welding or spot welding. The localized bonding may be used, for example, for repairs. For example, the repairs may repair a breach in the cover sheet 220 or to correct localized defects in the dual wall turbine blade 112. The defects may be found, for example, through inspection, such as radiographic, ultrasonic or thermographic inspection. The thermographic inspection may be accomplished with, for example, an infrared (IR) camera and flash lamps.

FIG. 4 illustrates an example of a probe 410. The probe 410 may include a tip 412 having head 416 and a protrusion 418. The head 416 may be a frustoconical shaped member that is tapered toward the protrusion 418 to provide a diminishing cross-sectional area. The protrusion 418 may extend outwardly away from the head 416. The protrusion 418 may have planar sides extending to a distal end 420 of the probe 410 forming the contacting area 414. The contacting area 414 may be a circular, triangular, rectangular or any other shaped surface, and may be dimensioned to correspond to at least a portion of the surface area 250 of a pedestal 212. (FIG. 2)

The head 416 and the protrusion 418 may be cooperatively manipulated to allow the probe 410 to access and abut otherwise unreachable areas of the outer surface 22 or the core 210 to perform bonding. In other examples, the contacting area 414 may be one or more of the planar surfaces of the protrusion 418. The protrusion 418 may be an electrically conductive material through which electrical power supplied by the resistance welder 350 may flow. The head 416 may be a non-conductive heat dissipating member surrounding the protrusion 414. In other examples, the head 416 may be an electrically conductive material through which electrical power supplied by the resistance welder 350 may flow.

The head 416 may be coupled with an insulator 422 by a neck joint 424. The insulator 422 may be formed of a non-conductive material that dissipates heat generated by current flowing through the probe 410. The neck joint 424 may fixedly couple the insulator 422 and head 416. The insulator 422 may also include a portion of the cooling passageway 316 (FIG. 3) included in the probe 410.

The probe 410 may also include an attachment end 430. The attachment end 430 may include a threaded member 432, a flange 434 and a bolt 436. The threaded member 432 may threadably couple with structure such as an arm, strut or other member through which the pressing force 370 may be exerted on the probe 410 by the pressing system 380. (FIG. 3) The threaded member 432 may be formed to include at least one aperture 438 through which the cooling fluid may flow into the cooling passageway 316 (FIG. 3) included in the probe 410. In an example, the aperture 438 may include an inlet and an outlet to provide circulation through the probe 410. The flange 434 may include a conical shaped end 440 to create a liquid tight seal with structure to which the threaded member 432 is detachably coupled. The bolt 436 may provide a grip location for rotationally removing and installing the probe 410 using a tool such as a wrench. FIG. 5 illustrates another example of a probe 410. The probe 410 of this example includes a tip 412 and an attachment end 430. In this example, the tip 412 may include a head 416, but not include a protrusion 418 (FIG. 4). Additionally or alternatively, the probe 410 may not include the cooling passageway 316. For example, the tip 412 may be solid without any internal passageways for cooling fluid 378. The surface of the probe 410 may be a curved surface, for example a dome shaped surface. The contacting area 414 may be disposed on any portion of the surface of the curved tip 412. The surface of the contacting area 414 may be three dimensionally contoured to match the surface area 250 of the pedestal 212 and/or the outer surface 222 of the cover sheet 220. The attachment end 430 may be a solid rigid shaft configured to be fixedly held in a compression fitting, such as a chuck. The compression fitting may be included in a structure such as an arm, strut or other member through which the pressing force 370 may be exerted on the probe 410 by the pressing system 380. (FIG. 3)

Figure 6:
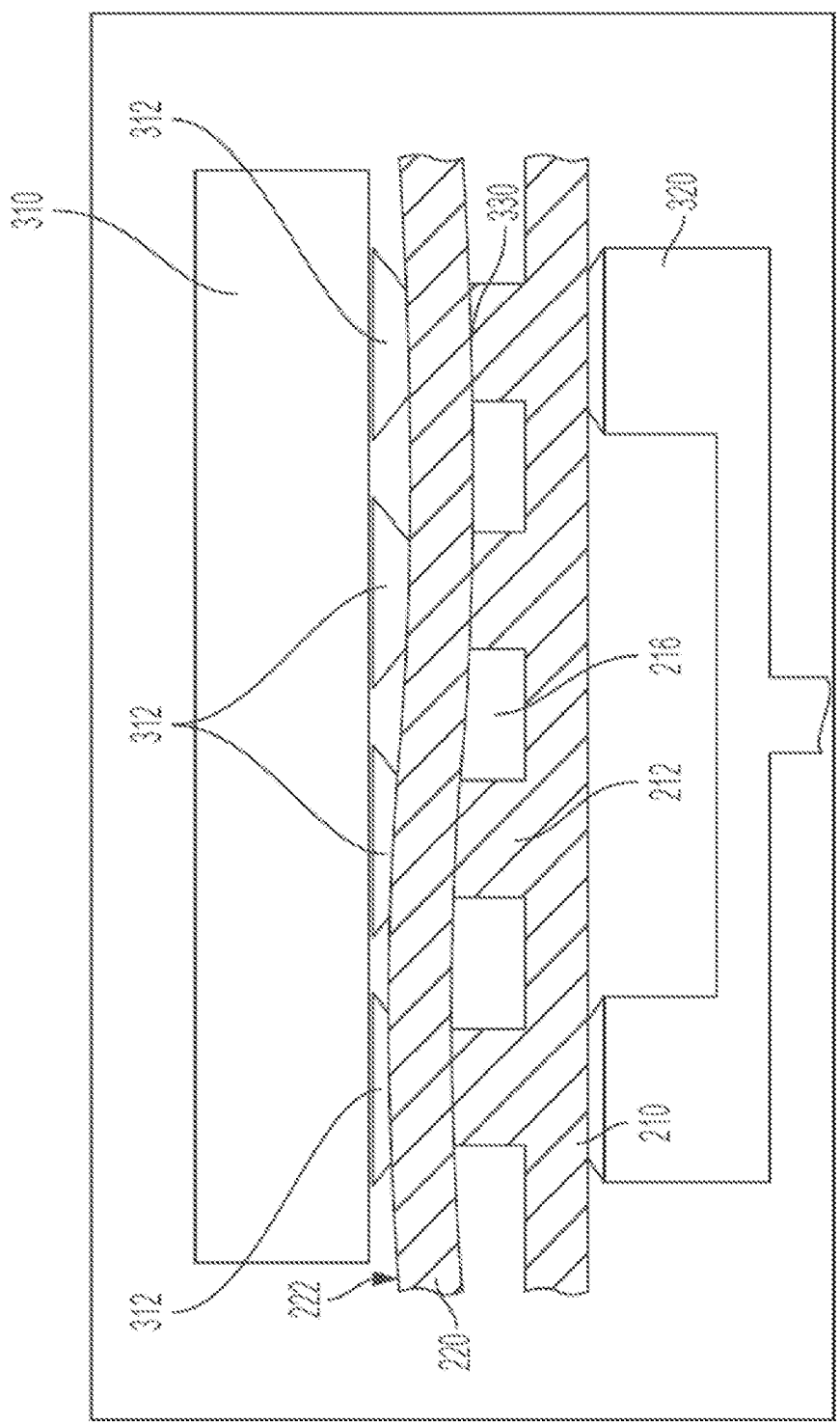
FIG. 6 illustrates a second example of the bonding system and a cut-away view of a 3D contoured dual wall structure.
Figure 7:
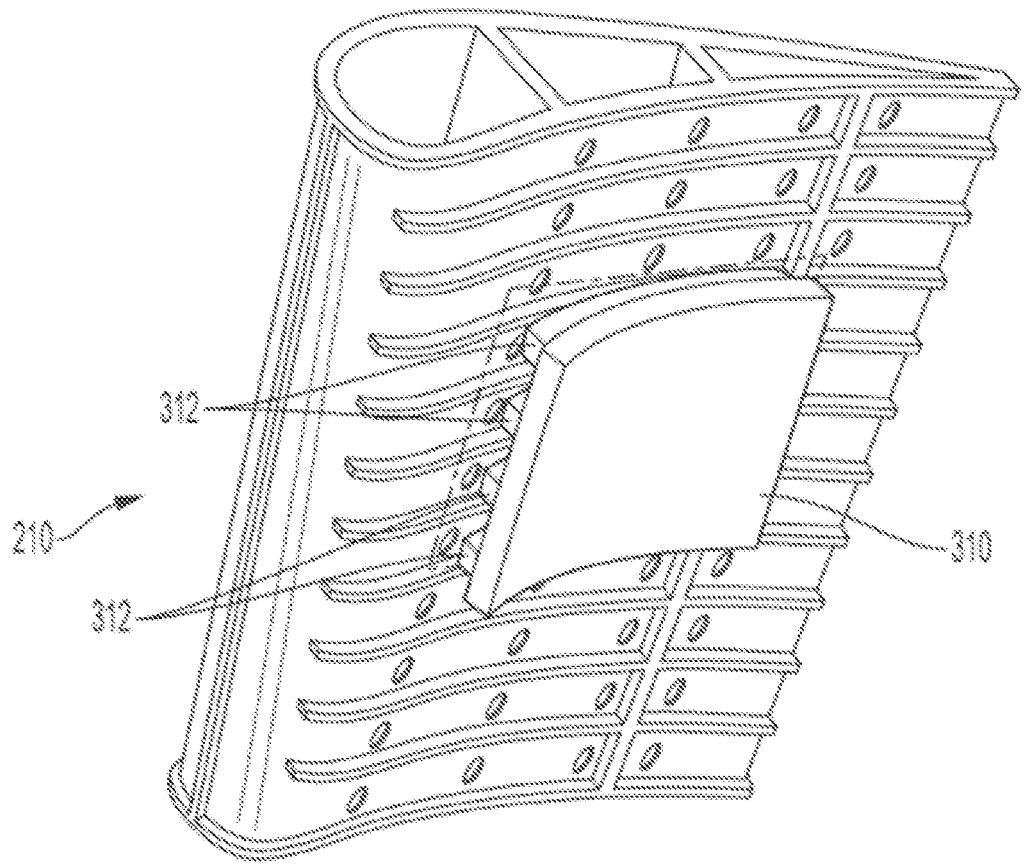
FIG. 7 illustrates a third example of the bonding system and 3D contoured dual wall structure.

FIGS. 6 and 7 illustrate examples of a portion of the bonding system 300 and a cut-away view of a three dimensional (3D) contoured dual wall structure. The bonding system 300 may be used to initially bond the cover sheet 220 and the core 210 to form a structure, such as a new airfoil. The bonding system 300 may simultaneously abut a corresponding tip 312 to each predetermined area of the cover sheet 220, such that each predetermined area of the cover sheet 220 aligns and abuts with one of the pedestals 212. The bonding system may then, at substantially the same time, bond the cover sheet 220 to the pedestals 212 at each second junction 330 of the cover sheet 220 and pedestals 212, such that a conductive electrical path 314 is formed between each tip 312 and respective pedestal 212, wherein each second junction 330 of the cover sheet 320 and core 310 may be a respective maximum temperature junction. Each conductive electrical path 314 may include a first junction 328, second junction 330, and third junction 334. Additionally, or alternatively, the bonding system 300 may be used to selectively repair an area of a pre-existing airfoil, such as to create or repair a bond between a single second junction 330 or preselected second junctions 330 of one of the pedestals 212 and the corresponding areas of the cover sheet 220. The bonding system may abut the tip 312 of the cover sheet probe 310 to a single area of the cover sheet 220, wherein the area of the cover sheet 220 abuts to one of the pedestals 212. The bonding system 300 may abut the tip 312 of the sink probe 322 to a predetermined area of the core 210 corresponding to the pedestal 212. The bonding system 300 may then create a bond at the single predetermined second junction 330 of the pedestal 212 and the cover sheet 220. Accordingly, in a repair mode, the processor circuitry 340 may selectively energize only some of the cover sheet probes 310 where a bonding repair is desired. Alternatively or in addition, as discussed herein, the bonding of three dimensional contoured surfaces may occur between the pedestal(s) 212 and the core 210.

FIG. 6 illustrates another example of a portion of the bonding system 300 and a cut-away view of a 3D contoured dual wall structure. One or more of the cover sheet probe 310 may each include a plurality of the tips 312. For example, multiple tips 312 may be coupled to the same cover sheet probe 310, as illustrated. The plurality of tips 312 may form a pattern of tips 312. The core 210 may include a plurality of the pedestals 212. The pedestals 212 may form a pattern of the pedestals 212. One or more of the tips 312 may abut against the outer surface 222 of the cover sheet 220. For example, one or more of tips 312 may abut against the outer surface 222 such that each one of the tips 312 match to one of the pedestals 212. The pattern of the pedestals 212 may match the pattern of tips 312 such that a location of each one of the tips 312 on the outer surface 222 corresponds to a location of each one of the pedestals 212 on the core 210. For example, the cover sheet probe 310 may include a tip 312 for each of the second junctions 330 of the cover sheet 320 and core 310.

FIG. 7 illustrates another example of a portion of the bonding system 300 and a 3D contoured dual wall structure. One cover sheet probe 310 may include tips 312 for only a portion of the second junctions 330. For example, one or more pull planes 710 of the core 210 may be determined based on the 3D contour of the core 210 and blade 212, for example, based on the degree of pull angle or draft built into the core 210 and/or blade 212. The pull planes 710 may corresponded to a portion of the 3D surface of the core 210, wherein a plurality of pedestals 212 may be packaged within one pull plane 710. The 3D contoured surface of the cover sheet probe 310 may correspond to the pull plane 710, wherein each one of the tips 312 of a single cover sheet probe 310 corresponds to a respective pedestal 212 within the pull plane 710. The bonding system 300 may include cover sheet probes 310 each corresponding to a respective pull plane 710 of the core 210, wherein each probe 310 includes a plurality of tips 312. Each tip 312 may correspond to a respective pedestal 212 and the three dimensional contoured surface of the tip 312 corresponding to the three dimensional contoured surface of the pedestal 212.

In a new manufacturing operating mode, the tips 312 may simultaneously be energized while abutted to the outer surface 222 such that the bonding system 300 simultaneously creates a bond at each second junction 330 of the cover sheet 220 and core 210. Additionally or alternatively, in a repair operating mode only selected of the tips 312 may be energized while abutted to one or more second junctions 330 such that a bond is created at only a portion of the second junctions 330 of the core 210 and cover sheet 220. Selection of the tips to energize may be user selected, or may be selected based on testing to identify existing bonds in need of repair.

One or more of the inner pedestal probe 320 may be placed on the core 210 to allow for conductive electrical paths 314 to form between the inner pedestal probe 320 and each tip 312 of the cover sheet probe 310 For example the inner pedestal probe 320 may be placed at a predetermined area of the core 210 to allow for bonds to be created simultaneously at each second junction 330 of the core 210. Alternatively or additionally, the inner pedestal probe 320 may be placed, for example, in an internal passage of the core 210 corresponding to one or more of the pedestals 212 to allow for bonds to be created at only a portion of the second junctions 330 of the core 210. For example, the inner pedestal probes 320 may be inserted in to the cooling channel 240 or flow channel 216. For example, the inner pedestal probe 320 may be inserted into the cooling channel 240 and contact a portion of the interior wall 242. The inner pedestal probe 320 may contact a portion of the interior wall 242 corresponding to one or more of the pedestals 212. Alternatively or in addition, as discussed herein, the bonding of three dimensional contoured surfaces may occur between the pedestal(s) 212 and the core 210.

Figure 8:
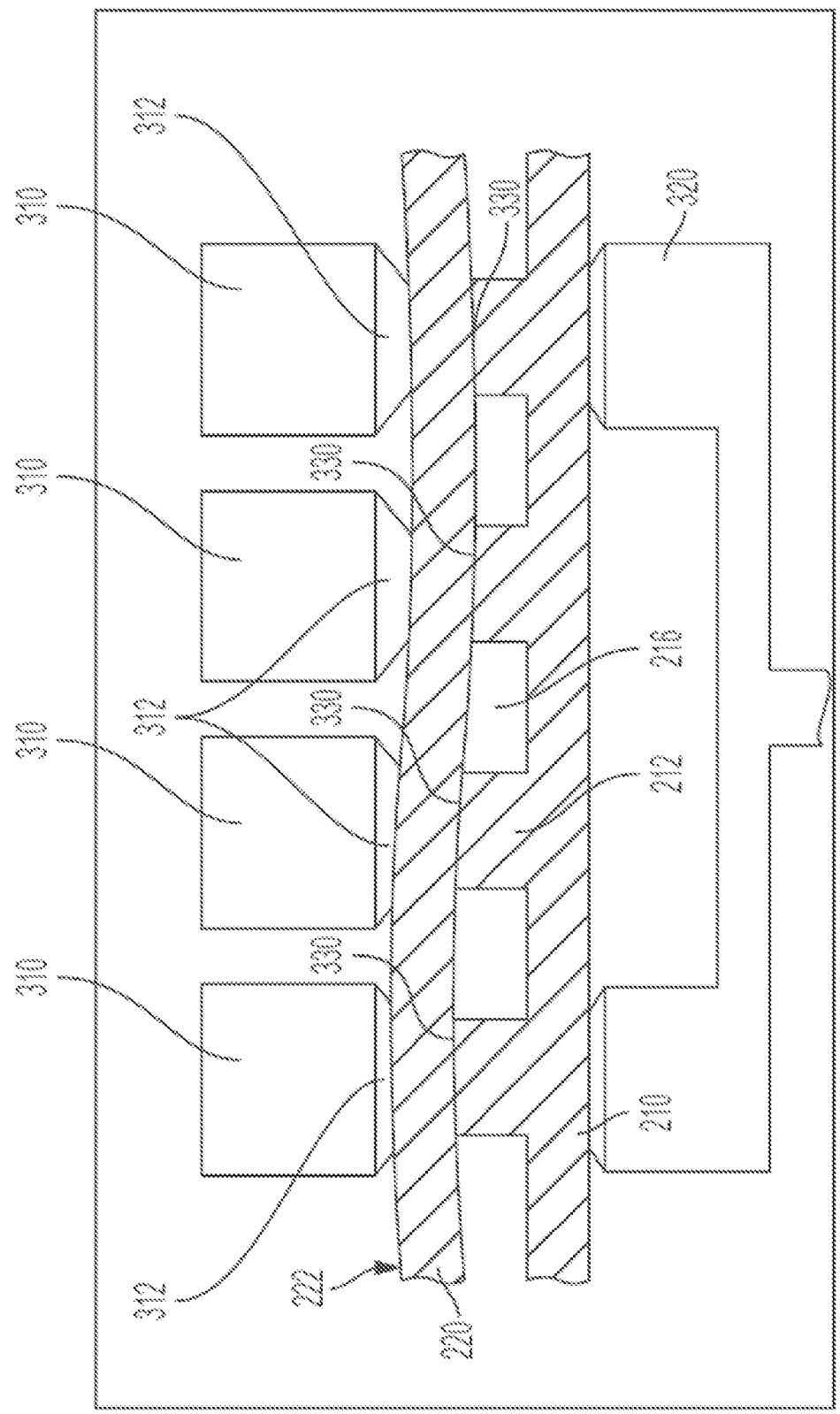
FIG. 8 illustrates a fourth example of the bonding system and a cut-away view of a 3D contoured dual wall structure.

FIG. 8 illustrates still another example of a portion of the bonding system 300 and a cut-away view of a 3D contoured dual wall structure. Each one of the plurality of cover sheet probes 310 may include a corresponding one of the tips 312. The core 210 may include a plurality of the pedestals 212. The plurality of cover sheet probes 310 may form a pattern. The pattern of the cover sheet probes 310 may match a pattern of pedestals 212. The corresponding tip 312 of each one of the cover sheet probes 310 may abut against the outer surface 222 of the cover sheet 220. The corresponding tip 312 of each one of the cover sheet probes 310 may each align with one of the pedestals 212. One or more of the inner pedestal probes 320 may abut a predetermined area of the core 310 to create the conductive electrical path 314 through the core 210 from the cover sheet probes 310 The inner pedestal probes 320 may align with an area of the core 210 abutting the inner surface 224 of the cover sheet 220 opposite the outer surface 222 abutted to the cover sheet probe 310 The inner pedestal probe 320 may, for example, be placed in the cooling channel 240 of the core 210 such that the inner pedestal probe 320 contacts the portion of the inner wall 242 opposite a location of one of the pedestals 212 being coupled with the interior wall 242.

Figure 9:
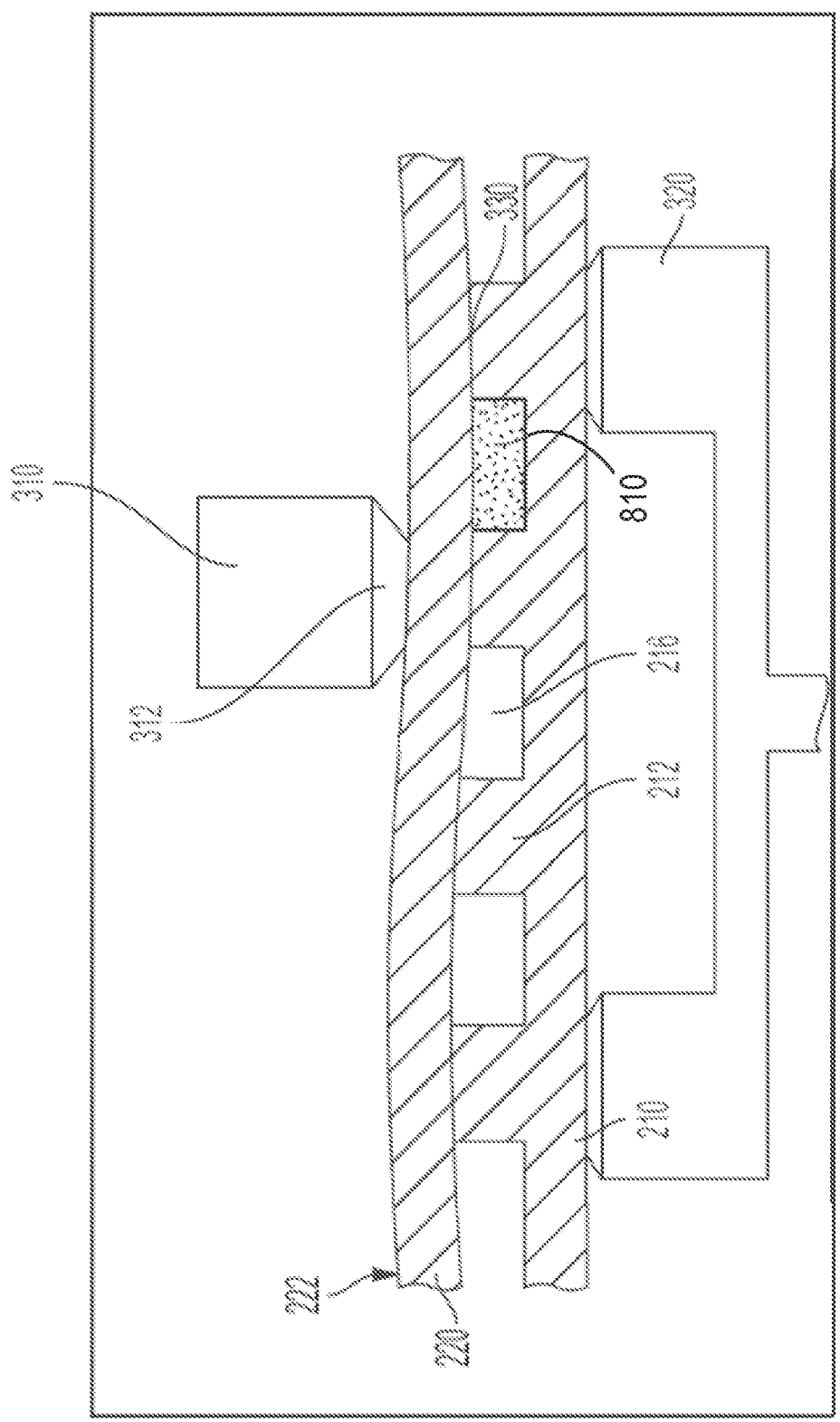
FIG. 9 illustrates a fifth example of the bonding system and a cut-away view of a 3D contoured dual wall structure.

FIG. 9 illustrates yet another example of a portion of the bonding system 300 and a cut-away view of a 3D contoured dual wall structure. A temporary shielding material 810 may be applied to the dual wall turbine blade 112. The temporary shielding material 810 may be used to further control the bonding process. The temporary shielding material 810 may help control the bonding process such that localized repair and/or rework can be done on one area the dual wall turbine blade 112 without affecting other areas of the dual wall turbine blade 112. For example, the temporary shielding material 810 may be applied to protect areas of the dual walled turbine blade 112, for example an area of the core 210 and/or the cover sheet 220, from the heat generated by the bonding process. For example, the temporary shielding material 810 may be applied adjacent to one or more of the pedestals 212. The temporary shielding material 810, for example, may be applied in one or more of the flow channels 216 on either side, or surrounding, one of more of the pedestals 212. The pedestals 212 may correspond to an area of the cover sheet 220 in contact with one or more of the tips 312 of one or more of the cover sheet probes 310 The temporary shielding material 810 may be made of an insulating material. For example, the temporary shielding material 810 may be ceramic. The temporary shielding material 810 may be removed after the bonding process is complete, for example, when the cover sheet probes 310 and inner pedestal probes 320 have been removed from the core 210 and cover sheet 220. The temporary shielding material 810 may be removed, for example, by a mechanical process such as drilling or pressure washing. Alternatively or additionally, the temporary shielding material 810 may be removed through a heating process to burn of or liquefy the temporary shielding material 810, and/or a chemical process such application of a solvent to dissolve the temporary shielding material 810.

Figure 10:
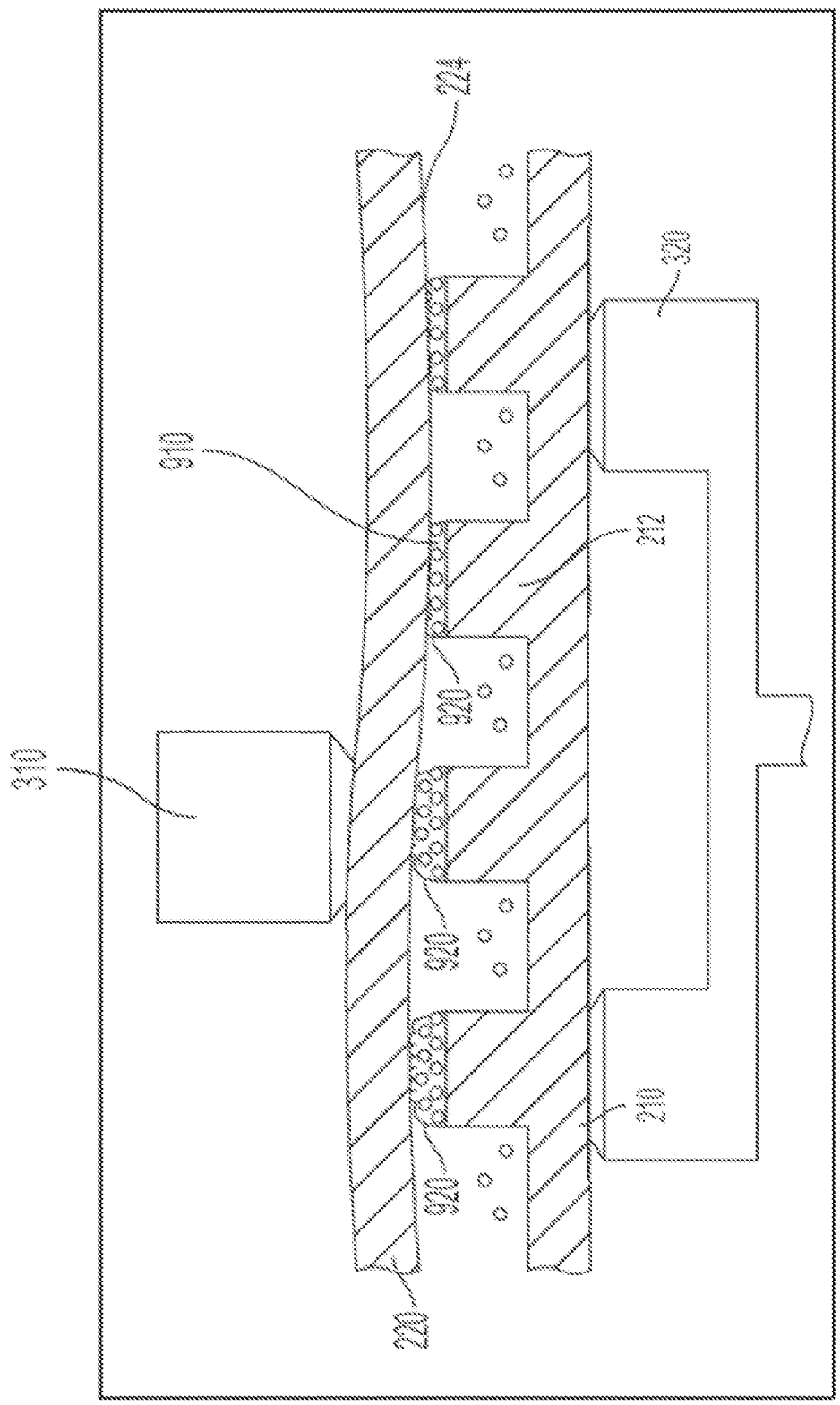
FIG. 10 illustrates a sixth example of the bonding system and a cut-away view of a 3D contoured dual wall structure.

FIG. 10 illustrates still another example of a portion of the bonding system 300 and a cut-away view of a 3D contoured dual wall structure. An adhesive 910 and/or a braze material 920 may be applied to the dual wall turbine blade 112. The adhesive 920 may be controllably applied to the core 210, for example, to one of more of the pedestals 212. Prior to applying the adhesive 910, the pedestals 212 may undergo standard cleaning and/or grinding procedures to remove contaminants such as dust, chemical residues, oxides or other compounds that could interfere with the bonding process. The adhesive 910 is contacted with and selectively deposited onto the pedestals 212. The adhesive 910 may be deposited only on the surface of the pedestals 212. The adhesive may additionally only be deposited on pre-selected pedestals 212. The adhesive 910 has a sufficient viscosity to be a self-supporting layer without flowing into the flow channels 216. The adhesive 910 may be applied by a rolling a belt or roller coated with the adhesive 910. The layer of adhesive 910 is controllably and uniformly deposited on to the pedestals 212 with a mass density (mass per unit area) that may lie in a range from about 0.001 $g/in^2$ to about 0.050 $g/in^2$, with a preferred range of 0.002 $g/in^2$ to 0.010 $g/in^2$. The range and preferred range may depend upon the composition and viscosity of the adhesive 910. The pedestal 212 shape and contour of the airfoil may also contribute to the range. A braze material 920 may be applied over the layer of adhesive 910. The braze material 920 may include a metal alloy. The composition of the braze material 920 may be selected based on the materials of the dual wall turbine blade 112, for example, such as the materials from which the core 210 and/or the cover sheet 220 are made. The braze material 920 is applied such that the braze material attaches to the adhesive 910. A predetermined amount of braze material 920 may be applied.

The braze material 920 may or may not be heated before the bonding process. By not heating the braze material 920 prior to the bonding process, operation costs and time may be reduced. However, the braze material 920 may be heated to a suitable temperature to adhere the braze material 920 to the core 210. For example, the braze material 920 may be heated to a sintering temperature. For example, the sintering temperature may be high enough to sinter the braze material 920, but low enough to avoid melting the braze material 920. The temperature may be in the range of approximately 55.6° C. below the solidus to 16.7° C. above the liquidus of the braze material 920. The liquidus is the lowest temperature at which the braze material is completely liquid, and the solidus is the highest temperature at which the braze material is completely solid. The temperature range may vary depending on the material used for the braze material 920. After heating, the braze material 920 may be attached to the core 210.

The cover sheet 220 may then contact the core 210, for example the cover sheet 220 may contact one or more of the pedestals 212. The cover sheet 220 may be held fixedly in place by the cover sheet probe 310 applying the pressing force 370. The applied pressing force 370 may then compress the adhesive 910 and the braze material 920. The adhesive 910 and the braze material 920 may be compressed between the surface area 250 of the one or more pedestals 212 and the corresponding inner surface 224 of the cover sheet 220. Electricity may then be applied along the conductive electrical path 314 between the cover sheet probe 310 and the inner pedestal probe 320. The electricity may generate heat along the conductive electrical path 314. The heat may liquate the braze material 920. The heat may liquate the surface area 250 of the one or more pedestals 212 in contact with the braze material 920. The heat from the flow of electricity and the pressing force 370 may bond the core 210, for example the one or more pedestals 212, with the cover sheet 220. The core 210 and the cover sheet 220 may be bonded by a resistance bonding. Alternatively or in addition, as discussed herein, the bonding of three dimensional contoured surfaces may occur between the pedestal(s) 212 and the core 210. After the bond process, the joint of the braze material 920 and the surface area 250 of the pedestal 212 may be indistinguishable from the rest of the core 210. One advantage of this process may be the small amount of braze material 920 used as compared to conventional brazing processes. The predetermined amount of braze powder 114 adhered to the pedestals 212 may lie in a range from about 0.04 g/in$^2$ to about 0.25 g/in$^2$, with a preferred range of about 0.06 g/in$^2$ to about 0.08 g/in$^2$. The brazing process may be done in air, a protective atmosphere, and/or in a vacuum.

Alternatively or additionally, a preplaced interface material, for example an interlayer assist material, may be heated by the electricity that passes through the interface of the pedestal 212 and cover sheet interface 220. This heated, preplaced material either diffuses into both the inner surface 224 of the cover sheet 220 and the surface area 250 of the pedestal 212 to create a diffusion bond or melt and create a braze joint. The preplaced material can be, for example, in the form of powder or foil. The preplaced material composition may be, for example, an alloy or pure element depending upon the base material and the type of bonding desired. The atmosphere the bonding will be conducted in depends upon the type of material being utilized and the intended results. The atmosphere, for example, may range from air to any other conceivable atmosphere providing the benefits desired.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways.

In some examples, each unit, subunit, and/or module of the system may include a logical component. Each logical component may be hardware or a combination of hardware and software. For example, each logical component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each logical component may include memory hardware, such as a portion of the memory, for example, that comprises instructions executable with the processor or other processors to implement one or more of the features of the logical components. When any one of the logical components includes the portion of the memory that comprises instructions executable with the processor, the logical component may or may not include the processor. In some examples, each logical components may just be the portion of the memory or other physical memory that comprises instructions executable with the processor or other processor to implement the features of the corresponding logical component without the logical component including any other hardware. Because each logical component includes at least some hardware even when the included hardware comprises software, each logical component may be interchangeably referred to as a hardware logical component.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

Each component may include additional, different, or fewer components. For example, the gas turbine engine 100 may include additional components such as intercoolers. The dual wall turbine blade 112 may include components not shown, such as a platform and/or shank. Additionally, the system 300 may be implemented with additional, different, or fewer components. The logic illustrated in the flow diagrams may include additional, different, or fewer operations than illustrated. The operations illustrated may be performed in an order different than illustrated.

In addition to the parameters 342 previously discussed and the example values in above Table 1, the operational parameters 342 may include additional settings. In some examples, these parameters 342 may vary or be set to a preferable range. For example, shown in table 2 below, two parameters 342 may be critical parameters. One critical parameter is that the percentage of bonding current (indicated, for one example, as weld current in the tables) must be in excess of 50%. Bonding current may, for example, be related to electrical current 346. The second critical parameter is that the time of bonding must be a fairly short time period, for example, 30 to 60 seconds, in order to prevent melting and expulsion that may deform the coversheet 220 and/or surrounding pedestals 212 not targeted for bonding. Bonding time may, for example, refer to the amount of time the electrical current 346 flows across the conductive electrical path 314 between the cover sheet probe 310 and the inner pedestal probe 320.

TABLE 2

Initial Trials to Oultine Approximate Parameters
Electrode Size: Generously Radiused Electrodes with 0.225" Flat
Sheet: Un-Bonded Ni-Flashed Lamilloy Sheet Components

| | | | | Parameters | | | | | | | | |
|---|---|---|---|---|---|---|---|---|---|---|---|---|
| Weld | Tap | Squeeze Time | Load (lb) | Pressure Air (psi) | Preheat | t-Preheat | Start UpSlope | t-Upslope | Weld % Current | t-Weld | Current Setup (A) | Current Read (A) | Visual Inspection |
| 1 | 2 | 30 | 400 | 31 | 30% | 90 | 40% | 30 | 50 | 90 | | | Melt and Expulsion |
| 2 | 2 | 30 | 400 | 31 | 30% | 90 | 40% | 30 | 50 | 60 | | | Borderline Melt |
| 3 | 2 | 30 | 400 | 31 | 30% | 90 | 40% | 30 | 50 | 30 | | | OK- Bond |
| 4 | 2 | 60 | 400 | 31 | 20% | 90 | 30% | 60 | 40 | 30 | | | No-Bond |
| 5 | 2 | 60 | 400 | 31 | 30% | 90 | 30% | 60 | 40 | 30 | | | No-Bond |
| 6 | 2 | 60 | 400 | 31 | 30% | 90 | 30% | 60 | 45 | 30 | | | Lightly Bonded |
| 7 | 2 | 60 | 400 | 31 | 30% | 90 | 30% | 60 | 50 | 30 | | | Good Bond |

The data above indicates that greater than 50% weld current for short times are needed to produce a good bond.
All welds were pulled apart for visual examination
Amperage range and readings were not recorded In another example, additional trials were conducted to provide a more detailed investigation of the effects of the percentage of bonding heat (indicated, for one example, as weld heat in the tables), bonding time, and up-slope parameters, for example start up-slope and/or up-slope time. The example parameters for the trials are provided below in Table 3, below, for the evaluation of heat (for example preheat, preheat time, and/or weld heat as shown in the table), bonding time, up-slope time, and preheat time.

TABLE 3

Using Standard AC Resistance Spot Welder and Copper Electrodes
Electrode Size: 0.375"/0.625" Flat, Materials to be bonded: HA230 0.026" with Lamilloy design comfigulations of cooling holes and pedestals

| | | | | | Resistance Bonding Parameters | | | | | | | |
|---|---|---|---|---|---|---|---|---|---|---|---|---|
| Weld | Test Date | Squeeze Time | Load (N) | Pressure Air (kPa) | Preheat | Preheat Time | Start UpSlope | Time Upslope | Weld Heat (%) | Weld Time | Nugget Size (mm) | Metallurgraphic Evaluations |
| 1 | Apr. 18, 2001 | 60 | 1779.29 | 213.7375 | 30% | 90 | 30% | 60 | 50 | 30 | 4.445 | Good bond, but formed nugget: 0.04" × 0.02" |
| 2 | Apr. 18, 2001 | 60 | 1779.29 | 213.7375 | 30% | 90 | 30% | 60 | 50 | 30 | 4.064 | Good bond, no nugget |
| 3 | Apr. 18, 2001 | 60 | 1779.29 | 213.7375 | 30% | 90 | 30% | 90 | 50 | 30 | 3.81 | Good bond, no nugget |
| 4 | Apr. 18, 2001 | 60 | 1779.29 | 213.7375 | 30% | 90 | 30% | 90 | 45 | 90 | 0 | No bond |
| 5 | Apr. 18, 2001 | 60 | 1779.29 | 213.7375 | 30% | 90 | 30% | 90 | 47 | 90 | 0 | Weak bond |
| 6 | Apr. 18, 2001 | 60 | 1779.29 | 213.7375 | 30% | 60 | 30% | 60 | 55 | 30 | 4.572 | Good bond, no nugget |
| 7 | Apr. 18, 2001 | 60 | 1779.29 | 213.7375 | 30% | 60 | 30% | 60 | 60 | 30 | 4.064 | Good bond, but formed nugget: 0.02" × 0.01" |

TABLE 3-continued

Using Standard AC Resistance Spot Welder and Copper Electrodes
Electrode Size: 0.375"/0.625" Flat, Materials to be bonded: HA230 0.026" with Lamilloy design comfigulations of cooling holes and pedestals

| | | | | | Resistance Bonding Parameters | | | | | | | |
|---|---|---|---|---|---|---|---|---|---|---|---|---|
| Weld | Test Date | Squeeze Time | Load (N) | Pressure Air (kPa) | Preheat | Preheat Time | Start UpSlope | Time Upslope | Weld Heat (%) | Weld Time | Nugget Size (mm) | Metallurgraphic Evaluations |
| 8 | May 1, 2001 | 60 | 1779.29 | 213.7375 | 30% | 60 | 30% | 60 | 65 | 30 | 4.318 | Nugget: 0.1" × 0.005" |
| 9 | May 1, 2001 | 60 | 1779.29 | 213.7375 | 30% | 60 | 30% | 60 | 70 | 30 | 4.318 | Nugget, a little metal in channel seen in micro |
| 10 | May 1, 2001 | 60 | 1779.29 | 213.7375 | 30% | 60 | 30% | 60 | 75 | 30 | 4.826 | Melt metal flowed in hot side holes and channels |
| 11 | May 1, 2001 | 60 | 1779.29 | 213.7375 | 30% | 60 | 30% | 60 | 80 | 30 | 5.334 | Melt metal flowed in hot side holes and channels |
| 12 | May 1, 2001 | 60 | 1779.29 | 213.7375 | 30% | 60 | 30% | 60 | 85 | 30 | 5.842 | Melt metal flowed in hot side holes and channels |
| 13 | May 1, 2001 | 60 | 1779.29 | 213.7375 | 30% | 60 | 30% | 60 | 90 | 30 | 6.35 | Melt metal flowed in hot side holes and channels |

The results in the Table 3 above indicate that bonding heat percentage and bonding time have much larger effects on the integrity of the bond than up-slope time or preheat time. The data above tends to indicate that bonding heat percentage should preferably be held in the range of 50% to 70% in order to provide a good bond between surfaces with little or no melting. Bonding heat percentage may be related to electrical current 346, electrical voltage 348, and/or the resistance of the materials being bonded. The data also indicates that bonding time should preferably be held to relatively low values, for example, below 90 cycles, in order to prevent melting. When the bonding time data from Table 2 is combined with that of Table 3, it indicates that bonding time should preferably be held to less than 60 cycles. The data from table 2 indicates that, in one example, melting began at approximately 60 cycles. Therefore it would tend to suggest that bonding time should preferably be held between 30 and 50 cycles.

In another example, additional samples were manufactured to evaluate the range of acceptable bonding heat in further detail via metallography and shear testing. The parameters 342 used to generate these samples and associated data are provided in Table 4 below for investigation of bonding heat percentage and associated shear test results.

TABLE 4

Using Standard AC Resistance Spot Welder and Copper Electrodes
Electrode Size: 0.375"/0.625" Flat: Materials to be bonded: Ni-Plated diffusion bonding heat treated HA 230 with Lamilloy cooling holes and pedestals

| | | | | | Resistance Bonding Parameters | | | | | | | |
|---|---|---|---|---|---|---|---|---|---|---|---|---|
| Weld | Test Date | Squeeze Time | Load (N) | Pressure Air (kPa) | Preheat % | Preheat Time | Start UpSlope | Upslope Time | WeldHeat % Current | Weld Time | Nugget Size (mm) | Metallurgraphic Evaluations |
| 14 | May 9, 2001 | 60 | 1779.29 | 213.737 | 30% | 60 | 30% | 60 | 50 | 30 | 2.794 | good bond, no nugget |
| 15 | May 9, 2001 | 60 | 1779.29 | 213.737 | 30% | 60 | 30% | 60 | 55 | 30 | 3.084 | good bond, no nugget |
| 16 | May 9, 2001 | 60 | 1779.29 | 213.737 | 30% | 60 | 30% | 60 | 60 | 30 | 3.302 | good bond, no nugget |
| 17 | May 9, 2001 | 60 | 1779.29 | 213.737 | 30% | 60 | 30% | 60 | 65 | 30 | 3.81 | good bond, no nugget |
| 18 | May 9, 2001 | 60 | 1779.29 | 213.737 | 30% | 60 | 30% | 60 | 70 | 30 | 4.064 | good bond, no nugget |
| The following are Tensile Shear Test Specimens | | | | | | | | | | | Area (mm2) | RT Ultimate Tensile Strength(UTS)/Load(Lb) |
| 14-1T | May 9, 2001 | 60 | 1779.29 | 213.737 | 30% | 60 | 30% | 60 | 50 | 30 | 5.677408 | 35.23 Ksi/310 Lb |
| 14-2T | May 9, 2001 | 60 | 1779.29 | 213.737 | 30% | 60 | 30% | 60 | 50 | 30 | 4.6387 | 33.33 Ksi/250 Lb |
| 16-1T | May 9, 2001 | 60 | 1779.29 | 213.737 | 30% | 60 | 30% | 60 | 60 | 30 | 7.354624 | 31.58 Ksi/360 Lb |
| 16-2T | May 9, 2001 | 60 | 1779.29 | 213.737 | 30% | 60 | 30% | 60 | 60 | 30 | 6.967728 | 35.65 Ksi/385 Lb |
| 18-1T | May 9, 2001 | 60 | 1779.29 | 213.737 | 30% | 60 | 30% | 60 | 70 | 30 | 7.74192 | 37.92 Ksi/455 Lb, Expulsion |
| 18-2T | May 9, 2001 | 60 | 1779.29 | 213.737 | 30% | 60 | 30% | 60 | 70 | 30 | 9.225788 | 28.67 Ksi/410 Lb, Expulsion |

The results shown in Table 4 above indicate that, in one example, 70% bonding heat produces borderline results with possible melting and expulsion. There is some variability at 70% bonding heat, as shown by the metallography results versus the shear test results. The parameters 342 that may have contributed to this variability include the applied load, the relative degree of mating of the faces to be bonded, for example, the surface 250 of the pedestals 212 and the inner surface 224 of the cover sheet 220, as well as the amount of Ni flashing present on the faces to be bonded. The effects of these items will be discussed later in the report.

In another example, additional experiments were conducted investigating very short bond times with the aim of producing successful diffusion bonds with minimal exposure to oxidation of the bond faces. The parameters 342 used for these trials and the results are shown in Table 5 below. The data indicates that bonding becomes very sensitive with cycles that are on the order of $1/60^{th}$ of a second. Extremely short times appear to lack robustness and may be even more sensitive when actual manufacturing variability (pedestal size, surface condition, etc.) is introduced. This indicates short cycle times of $1/60^{th}$ of a second or shorter would not be a valid approach.

TABLE 5

Investigation of Very Short Bonding Times

Electrode Size: 0.225"/0.625" Flat Copper Electrodes
Materials: Ni-plated and simulated bonding heat treated HA230 0.026" with Lamilloy holes and pedestals

| | | Parameters | | | | | | | | | | |
|---|---|---|---|---|---|---|---|---|---|---|---|---|
| Weld | Date | Squeeze Time | Load (N) | Pressure Air (kPa) | Pre-heat | Pre-heat Time | Start UpSlope | t-Upslope | WeldHeat % Current | Weld Time | Current Setup (A) | Current Read (A) | Metallurgraphic Evaluations |
| 22 | May 9, 2001 | 60 | 1779.29 | 213.737 | 30% | 60 | 30% | 60 | 65 | 1 | .5-4.2 | 4110 | Good bond, no nugget |
| 23 | May 9, 2001 | 60 | 1779.29 | 213.737 | 30% | 60 | 30% | 60 | 75 | 2 | .5-3.5 | 3190 | Weak bond, no nugget |

Electrode Size: 0.150"/0.160" Square Flat (Cu—Al3O2 and Cu—Zr), Ni-Plated
diffusion bonding heat treated HA 230 sheet (0.026") with Lamilloy holes and pedestals

| | | | | Parameters | | | | | |
|---|---|---|---|---|---|---|---|---|---|
| Weld | Date | Electrode | Tap | Squeeze Time | Load (N) | Pressure Air (kPa) | Preheat | Preheat Time | Start UpSlope |
| 24 | Aug. 2, 2001 | Cu—Zr | 1 | 60 | 689.644 | 213.737 | 30% | 60 | 30% |
| 25 | Aug. 2, 2001 | Cu—Zr | 1 | 60 | 689.644 | 213.737 | 30% | 60 | 30% |
| 26 | Aug. 2, 2001 | Cu—Zr | 1 | 60 | 689.644 | 213.737 | 30% | 60 | 30% |
| 27 | Aug. 2, 2001 | Cu—Zr | 1 | 60 | 689.644 | 213.737 | 30% | 60 | 30% |
| 28 | Aug. 2, 2001 | Cu—Zr | 1 | 60 | 689.644 | 213.737 | 30% | 60 | 30% |

Electrode Size: 0.160/0.180" Square Flat (Cu—Al3O2 and Cu—Zr), Ni-Plated
diffusion bonding heat treated HA 230 sheet 0.026") with Lamilloy holes and pedestals

| | Parameters | | | | | | |
|---|---|---|---|---|---|---|---|
| Weld | t-Upslope | WeldHeat % Current | Weld Time | Current Setup (A) | Current Read (A) | Nugget Size (mm2) | Metallurgraphic Evaluations |
| 24 | 60 | 65 | 1 | .5-3.5 | ? | | Weak bond, no nugget |
| 25 | 60 | 65 | 2 | .5-3.0 | 2770 | | Weak bond, no nugget |
| 26 | 60 | 70 | 2 | .5-3.2 | 3060 | | Good bond, no nugget |
| 27 | 60 | 75 | 2 | .5-3.5 | 3480 | | Good bond, no nugget |
| 28 | 60 | 80 | 2 | .5-4.0 | 3820 | | Good bond, nugget |

In another example, additional testing was conducted to evaluate the room temperature shear strength of bonds produced in the preferable range of 50% to 70% bonding heat. The parameters 342 evaluated and the respective test results are shown in Table 6 below. In one example, the results indicate that 70% bonding heat produces a slightly larger bond area (using round bonding probes, for example probe 410 shown in FIG. 5) and also a slightly higher ultimate shear strength than a lower percentage of bonding heat, for example 50-60%. The bond area may refer to, for example, the nugget size indicated in the tables.

TABLE 6

Room Temperature Shear Strength of 60% and 70% Bonding Heat
Using Standard AC Resistance Spot Welder and Copper Electrodes
Electrode Machined to 0.225" diamter round at the tips (flat): Materials to be bonded:
Ni-Plated diffusion bonding heat treated HA 230 with Lamilloy cooling holes and pedestals

| | | | | Parameters | | | | | | |
|---|---|---|---|---|---|---|---|---|---|---|
| Weld | Test Date | Squeeze Time | Load (N) | Pressure Air (kPa) | Preheat | Preheat Time | Start UpSlope | Upslope Time | WeldHeat % Current | Weld Time |
| Tensile Shear Tests at Room Temperature | | | | | | | | | | |
| 14-3 | May 29, 2001 | 60 | 1779.29 | 213.737 | 30% | 60 | 30% | 60 | 50 | 30 |
| 16-3 | May 29, 2001 | 60 | 1779.29 | 213.737 | 30% | 60 | 30% | 60 | 60 | 30 |
| 16-3T | May 29, 2001 | 60 | 1779.29 | 213.737 | 30% | 60 | 30% | 60 | 60 | 30 |
| 16-4T | May 29, 2001 | 60 | 1779.29 | 213.737 | 30% | 60 | 30% | 60 | 60 | 30 |
| 16-5T | May 29, 2001 | 60 | 1779.29 | 213.737 | 30% | 60 | 30% | 60 | 60 | 30 |
| 16-6T | May 29, 2001 | 60 | 1779.29 | 213.737 | 30% | 60 | 30% | 60 | 60 | 30 |
| 18-3 | May 29, 2001 | 60 | 1779.29 | 213.737 | 30% | 60 | 30% | 60 | 70 | 30 |
| 18-3T | May 29, 2001 | 60 | 1779.29 | 213.737 | 30% | 60 | 30% | 60 | 70 | 30 |
| 18-4T | May 29, 2001 | 60 | 1779.29 | 213.737 | 30% | 60 | 30% | 60 | 70 | 30 |
| 18-5T | May 29, 2001 | 60 | 1779.29 | 213.737 | 30% | 60 | 30% | 60 | 70 | 30 |
| 18-6T | May 29, 2001 | 60 | 1779.29 | 213.737 | 30% | 60 | 30% | 60 | 70 | 30 |

| | | | | Parameters | | | | | |
|---|---|---|---|---|---|---|---|---|---|
| Weld | Test Date | Squeeze Time | Load (N) | Current Read (A) | Nugget Size (mm2) | Load (Lb) | Load (N) | Room Temp Strength (MPa) | Ave. Strength (MPa) |
| Tensile Shear Tests at Room Temperature | | | | | | | | | |
| 14-3 | May 29, 2001 | 60 | 1779.29 | 1700 | | | | | |
| 16-3 | May 29, 2001 | 60 | 1779.29 | 2350 | | | | | |
| 16-3T | May 29, 2001 | 60 | 1779.29 | 2350 | 8.2322416 | 330 | 1467.91 | 175.31 | |
| 16-4T | May 29, 2001 | 60 | 1779.29 | 2350 | 8.2322416 | 325 | 1445.67 | 175.61 | |
| 16-5T | May 29, 2001 | 60 | 1779.29 | 2350 | 6.7225672 | 260 | 1156.54 | 172.04 | |
| 16-6T | May 29, 2001 | 60 | 1779.29 | 2350 | 6.77418 | 235 | 1045.33 | 154.31 | 170.07 |
| 18-3 | May 29, 2001 | 60 | 1779.29 | 3040 | | | | | |
| 18-3T | May 29, 2001 | 60 | 1779.29 | 3040 | | | | | |
| 18-4T | May 29, 2001 | 60 | 1779.29 | 3040 | 9.99998 | 450 | 2001.7 | 200.17 | |
| 18-5T | May 29, 2001 | 60 | 1779.29 | 3040 | 10.64514 | 465 | 2068.42 | 194.31 | |
| 18-6T | May 29, 2001 | 60 | 1779.29 | 3040 | 9.225788 | 325 | 1445.67 | 156.70 | 183.73 |

The data shown in Table 6 is very good considering that commercial literature quotes a yield strength on base metal of HA230 as in the 35 ksi to 40 ksi range. The data shown in Table 6 represents actual resistance bonding of the Ni-flashed surface without any melting occurring.

When considering the relatively brief bond cycle utilized and the fact that no melting occurs, questions arose concerning the elevated temperature strength of the bonds. Therefore, in another example, additional specimens for shear testing were manufactured for 60%, 70%, and 80% bonding heat. In one example, these specimens were designated for 1144.261 K shear testing with the exception of several 80% bonding heat specimens which would be utilized for generating room temperature shear data for comparison to the data provided in Table 6. The parameters 342 utilized and associated results are provided in Table 7 below.

TABLE 7

Effects of % Bonding Heat on Elevated Temperature Shear Stress
Using Standard AC Resistance Spot Welder and Copper Electrodes
Electrode Machined to 0.225" diamter round at the tips (flat); Materials to be bonded:
Ni-Plated diffusion bonding heat treated HA 230 with Lamilloy cooling holes and pedestals

| | | | Resistance Bonding Parameters | | | | | | | | |
|---|---|---|---|---|---|---|---|---|---|---|---|
| Weld | Test Date | Squeeze Time | Preheat | Preheat Time | Start UpSlope | Upslope Time | WeldHeat % Current | Weld Time | Current Read (A) | Nugget Size (mm2) | Load (N) |
| Tensile Shear Tests at Room Temperature | | | | | | | | | | | |
| 16-7T | Jun. 22, 2001 | 60 | 30% | 60 | 30% | 60 | 60 | 30 | 2370 | 7.1613 | 177.929 |
| 16-8T | Jun. 22, 2001 | 60 | 30% | 60 | 30% | 60 | 60 | 30 | 2350 | 6.0645 | 155.688 |
| 16-9T | Jun. 22, 2001 | 60 | 30% | 60 | 30% | 60 | 60 | 30 | 2370 | 6.9032 | 155.688 |
| 16-10T | Jun. 22, 2001 | 60 | 30% | 60 | 30% | 60 | 60 | 30 | 2350 | 6.9032 | 142.343 |
| 16N1a | Jun. 22, 2001 | 60 | 30% | 60 | 30% | 60 | 60 | 30 | 2350 | | |
| 16N1b | Jun. 22, 2001 | 60 | 30% | 60 | 30% | 60 | 60 | 30 | 3880 | | |
| 18-7T | Jun. 22, 2001 | 60 | 30% | 60 | 30% | 60 | 70 | 30 | 3040 | 8.1935 | 329.168 |

TABLE 7-continued

Effects of % Bonding Heat on Elevated Temperature Shear Stress
Using Standard AC Resistance Spot Welder and Copper Electrodes
Electrode Machined to 0.225" diamter round at the tips (flat); Materials to be bonded:
Ni-Plated diffusion bonding heat treated HA 230 with Lamilloy cooling holes and pedestals

| 18-8T | Jun. 22, 2001 | 60 | 30% | 60 | 30% | 60 | 70 | 30 | 3040 | 7.6774 | 456.167 |
| 18-9T | Jun. 22, 2001 | 60 | 30% | 60 | 30% | 60 | 70 | 30 | 3040 | 8.5161 | 502.649 |
| 19 | Jun. 22, 2001 | 60 | 30% | 60 | 30% | 60 | 75 | 30 | 3480 | | |
| 20 | Jun. 22, 2001 | 60 | 30% | 60 | 30% | 60 | 80 | 30 | 3880 | | |
| 20-1T | Jun. 22, 2001 | 60 | 30% | 60 | 30% | 60 | 80 | 30 | 3880 | 12.0000 | 2313.08 |
| 20-2T | Jun. 22, 2001 | 60 | 30% | 60 | 30% | 60 | 80 | 30 | 3880 | 11.4193 | 1979.46 |
| 20-3T | Jun. 22, 2001 | 60 | 30% | 60 | 30% | 60 | 80 | 30 | 3880 | 12.7097 | 1934.96 |
| 20-4T | Jun. 22, 2001 | 60 | 30% | 60 | 30% | 60 | 80 | 30 | 3880 | 10.9677 | 355.858 |
| 20-5T | Jun. 22, 2001 | 60 | 30% | 60 | 30% | 60 | 80 | 30 | 3880 | 8.5806 | 444.822 |
| 20-6T | Jun. 22, 2001 | 60 | 30% | 60 | 30% | 60 | 80 | 30 | 3920 | 9.4639 | 462.615 |

| | | | Resistance Bonding Parameters | | | | | |
|---|---|---|---|---|---|---|---|---|
| Weld | Test Date | Squeeze Time | Preheat | Strength (MPa) | Ave. Strength (MPa) | Test Temp (K) | Failure | Expulsion |
| Tensile Shear Tests at Room Temperature | | | | | | | | |
| 16-7T | Jun. 22, 2001 | 60 | 30% | 24.821136 | | 1144.261 | Bond | No |
| 16-8T | Jun. 22, 2001 | 60 | 30% | 25.6485072 | | 1144.261 | Bond | No |
| 16-9T | Jun. 22, 2001 | 60 | 30% | 22.5458652 | | 1144.261 | Bond | No |
| 16-10T | Jun. 22, 2001 | 60 | 30% | 20.615324 | 23.4077102 | 1144.261 | Bond | No |
| 16N1a | Jun. 22, 2001 | 60 | 30% | NDE (6 spots) | | | | |
| 16N1b | Jun. 22, 2001 | 60 | 30% | NDE (1 spot) | | | | |
| 18-7T | Jun. 22, 2001 | 60 | 30% | 40.1964508 | | 1144.261 | Bond | No |
| 18-8T | Jun. 22, 2001 | 60 | 30% | 59.7086216 | | 1144.261 | Bond | No |
| 18-9T | Jun. 22, 2001 | 60 | 30% | 59.02332424 | 52.97613221 | 1144.261 | Bond | No |
| 19 | Jun. 22, 2001 | 60 | 30% | Micro | | | | |
| 20 | Jun. 22, 2001 | 60 | 30% | Micro | | | | |
| 20-1T | Jun. 22, 2001 | 60 | 30% | 193.05328 | | RT | Bond | Yes |
| 20-2T | Jun. 22, 2001 | 60 | 30% | 173.058476 | | RT | Bond | Yes |
| 20-3T | Jun. 22, 2001 | 60 | 30% | 152.374196 | 173.058476 | RT | Bond | Yes |
| 20-4T | Jun. 22, 2001 | 60 | 30% | 32.44592941 | | 1144.261 | Bond | Yes |
| 20-5T | Jun. 22, 2001 | 60 | 30% | 51.84030075 | | 1144.261 | Bond | Yes |
| 20-6T | Jun. 22, 2001 | 60 | 30% | 48.77925442 | 44.35516153 | 1144.261 | Bond | Yes |

The data indicates that a bonding heat percentage of 70% produces a significant increase in elevated temperature shear strength as compared to a bonding heat percentage of 60%. The data also indicates that 80% bonding heat produces shear properties similar to that of the bonds produced in the preferable range of 50% to 70%, but also produces unacceptable melting and expulsion into the flow channels 216. In general this data indicates that the repair process should preferable use 70% bonding heat in order to produce the best possible bond properties without melting or expulsion.

An additional question arose as to the basic inspectability of the bonds, for example, for NDT and/or NDE repair purposes. In one example, un-bonded component sheets of lamilloy were bonded in a number of different locations utilizing different parameters 342. The bonded sheet was then NDE inspected, for example, by the bonding system 300. The parameters 342 utilized to bond the various areas, for example the surface area 250 of the pedestal 212 and the inner surface 224 of the cover sheet 220, are provided in Table 8 below. In one example, the parameters 16N, 17N, 18N, 19N, and 20N were utilized to bond the cover sheets 220 in a number of different locations. These parameters correspond to 60%, 70%, 75%, and 80% bonding heat. All bonds were detectable during inspection, this demonstrated basic inspectability. More detailed discussion of NDE inspectability and the detectability of melting or wicked channels will be discussed later in this report.

TABLE 8

Parameters and Arrangement on Cover Sheet for Determining Feasibility of NDE Inspection
Electrode Size: 0.225"/0.625" Flat; Ni-Plated diffusion bonding heat treated HA 230 with Lamilloy
Electrodes machined to 0.225" diameter at the tip (flat)

| | | | | Parameters | | | | | | | | | |
|---|---|---|---|---|---|---|---|---|---|---|---|---|---|
| Weld | Tap | Squeeze Time | Load (N) | Pressure Air (kPa) | Preheat | t-Preheat | Start UpSlope | t-Upslope | WeldHeat % Current | t-Weld | Current Setup (A) | Current Read (A) | Note |
| Tensile Shear Tests at Room Temperature | | | | | | | | | | | | | |
| 16N | 1 | 60 | 1779.29 | 213.737 | 30% | 60 | 30% | 60 | 60 | 30 | .5-2.5k | 2370 | NDE |
| 18N | 1 | 60 | 1779.29 | 213.737 | 30% | 60 | 30% | 60 | 70 | 30 | .5-3.5k | 3040 | NDE |
| 19N | 1 | 60 | 1779.29 | 213.737 | 30% | 60 | 30% | 60 | 75 | 30 | .5-3.5k | 3480 | NDE |
| 20N | 1 | 60 | 1779.29 | 213.737 | 30% | 60 | 30% | 60 | 80 | 30 | .5-4k | 3880 | NDE |

TABLE 8-continued

Parameters and Arrangement on Cover Sheet for Determining Feasibility of NDE Inspection
Electrode Size: 0.225"/0.625" Flat; Ni-Plated diffusion bonding heat treated HA 230 with Lamilloy
Electrodes machined to 0.225" diameter at the tip (flat)

| | | | | Parameters | | | | | | | | | |
|---|---|---|---|---|---|---|---|---|---|---|---|---|---|
| Weld | Tap | Squeeze Time | Load (N) | Pressure Air (kPa) | Preheat | t-Preheat | Start UpSlope | t-Upslope | WeldHeat % Current | t-Weld | Current Setup (A) | Current Read (A) | Note |
| 21N | 1 | 60 | 1779.29 | 213.737 | 30% | 60 | 30% | 60 | 80 | 30 | .5-4.5k | 4220 | NDE |
| 21 | 1 | 60 | 1779.29 | 213.737 | 30% | 60 | 30% | 60 | 80 | 30 | .5-5k | 4220 | Micro |
| 16N5s | 1 | 60 | 1779.29 | 213.737 | 30% | 60 | 30% | 60 | 80 | 30 | .5-2.5k | 2370 | NDE |

Materials: Ni-plated and bonding heat treated HA230 0.026" with holes and pedestals Table 8, above, shows one example of the parameters 342 used for bonding the cover sheet 220.

In one example, trials were then conducted with rectangular probes, for example, probe 410 shown in FIG. 4, scaling the applied stress and/or load down from that of the round probe, for example, probe 410 shown in FIG. 5. The parameters 342 used for the first set of trials are provided in Table 9 below. The results indicate that all samples illustrated varying levels of melting. Some examples illustrated the onset of melting while others illustrated full melting.

TABLE 9

Initial Trials - Investigation Scaling The Applied Stress To Rectangular Electrodes
Electrode Size: 0.125" x 0.125" square
All samples were Ni Flashed

| | | | | Parameters | | | | | | |
|---|---|---|---|---|---|---|---|---|---|---|
| Weld | Tap | Squeeze Time | Load (lb) | Preheat | t-Preheat | Start UpSlope | t-Upslope | Weld % Current | t-Weld | |
| 1 | 1 | 90 | 63 | 30% | 90 | 30% | 60 | 60 | 30 | Signs of Melting |
| 2 | 1 | 90 | 63 | 30% | 90 | 30% | 60 | 60 | 60 | Signs of Melting |
| 3 | 1 | 90 | 63 | 30% | 90 | 30% | 60 | 60 | 45 | Signs of Melting |
| 4 | 1 | 90 | 63 | 30% | 90 | 30% | 60 | 50 | 45 | Melting |
| 5 | 1 | 90 | 63 | 30% | 90 | 30% | 60 | 70 | 30 | Melting |
| 6 | 1 | 90 | 63 | 30% | 60 | 30% | 60 | 60 | 30 | Signs of Melting |
| 7 | 1 | 90 | 63 | 30% | 30 | 30% | 60 | 60 | 30 | Signs of Melting |
| 8 | 1 | 90 | 63 | 30% | 90 | 40% | 60 | 60 | 30 | Signs of Melting |
| 9 | 1 | 90 | 63 | 30% | 90 | 45% | 60 | 60 | 30 | Signs of Melting |
| 10 | 1 | 90 | 63 | 30% | 90 | 30% | 90 | 60 | 30 | Melting |
| 11 | 1 | 90 | 63 | 30% | 90 | 30% | 30 | 60 | 30 | Melting |
| 12 | 1 | 90 | 63 | 30% | 90 | 30% | 60 | 60 | 30 | Signs of Melting |

In one example, the initial trials were then repeated using a higher load in order to insure full contact of the mating faces, for example the surface area 250 of the pedestal 212 and the inner surface 224 of the cover sheer 220. The results from these example trials are shown in Table 10 below. The results indicate that proper loading is critical. Loading may, for example, refer to pressing force 370. The data indicates that when using proper loading, probes 410 of material Cu—Zr, a bonding current in the range of 60% to 70%, and a bonding time between 30 and 60 cycles, preferable results will be produced. In one example, the parameters shown in Table 9 produce microstructures. The microstructure represents bond #4 and bond #5 from Table 10 below. All other bonds were metallographically evaluated and demonstrated varying degrees of grain growth in the bonded interlayer of Ni flashing.

TABLE 10

Trials with high load utilizing Cu—Zr rectangular electrodes
Electrode Size: 0.125" x 0.125" square
All samples were Ni Flashed

| | | | | Parameters | | | | | | |
|---|---|---|---|---|---|---|---|---|---|---|
| Weld | Tap | Squeeze Time | Load (lb) | Preheat | t-Preheat | Start UpSlope | t-Upslope | Weld % Current | t-Weld | |
| 1 | 1 | 90 | 600 | 30% | 90 | 30% | 60 | 60 | 30 | Bonded - No Signs of Significant Grain Growth in Ni Flash |
| 2 | 1 | 90 | 600 | 30% | 90 | 30% | 60 | 60 | 60 | Bonded - No Signs of Significant Grain Growth in Ni Flash |

TABLE 10-continued

Trials with high load utilizing Cu—Zr rectangular electrodes
Electrode Size: 0.125" × 0.125" square
All samples were Ni Flashed

| Weld | Tap | Squeeze Time | Load (lb) | Preheat | t-Preheat | Start UpSlope | t-Upslope | Weld % Current | t-Weld | |
|---|---|---|---|---|---|---|---|---|---|---|
| 3 | 1 | 90 | 600 | 30% | 90 | 30% | 60 | 60 | 45 | Bonded - No Signs of Significant Grain Growth in Ni Flash |
| 4 | 1 | 90 | 600 | 30% | 90 | 30% | 60 | 50 | 45 | Bonded - No Signs of Significant Grain Growth in Ni Flash |
| 5 | 1 | 90 | 600 | 30% | 90 | 30% | 60 | 70 | 30 | Bonded - Evidence of Significant Grain Growth in Ni - Flash |
| 6 | 1 | 90 | 600 | 30% | 60 | 30% | 60 | 60 | 30 | Bonded - No Signs of Significant Grain Growth in Ni Flash |
| 7 | 1 | 90 | 600 | 30% | 30 | 30% | 60 | 60 | 30 | Bonded - No Signs of Significant Grain Growth in Ni Flash |
| 8 | 1 | 90 | 600 | 30% | 90 | 40% | 60 | 60 | 30 | Bonded - No Signs of Significant Grain Growth in Ni Flash |
| 9 | 1 | 90 | 600 | 30% | 90 | 45% | 60 | 60 | 30 | Bonded - No Signs of Significant Grain Growth in Ni Flash |
| 10 | 1 | 90 | 600 | 30% | 90 | 30% | 90 | 60 | 30 | Bonded - No Signs of Significant Grain Growth in Ni Flash |
| 11 | 1 | 90 | 600 | 30% | 90 | 30% | 30 | 60 | 30 | Bonded - No Signs of Significant Grain Growth in Ni Flash |
| 12 | 1 | 90 | 600 | 30% | 90 | 30% | 60 | 60 | 30 | Bonded - No Signs of Significant Grain Growth in Ni Flash |

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a method comprising: aligning a pedestal of a core of a three dimensional (3D) contoured dual wall structure to abut an inner surface of a cover sheet of the dual wall structure; abutting a 3D contoured surface of a tip of a cover sheet probe against a corresponding 3D contoured outer surface of the cover sheet opposite the pedestal abutting the inner surface of the cover sheet; coupling an inner pedestal probe to the dual wall structure to create a conductive electrical path from the cover sheet probe through at least part of the dual wall structure; applying a predetermined localized pressing force to the corresponding 3D contoured outer surface of the cover sheet with the cover sheet probe; heating a junction between the inner surface of the cover sheet abutting the pedestal and the pedestal by controlling a flow of electric power from the cover sheet probe to the inner pedestal probe; creating a heated area in the junction; and fixedly coupling the coversheet and the pedestal with the heated area.

A second aspect related to the method of aspect 1, wherein fixedly coupling the coversheet and the pedestal with the heated area comprises diffusion bonding in the heated area, resistance bonding in the heated area, or braze bonding in the heated area.

A third aspect relates to the method of any preceding aspect, wherein the dual wall structure is a turbine blade or a turbine vane.

A fourth aspect relates to the method of any preceding aspect, wherein abutting the 3D contoured surface of the tip of the cover sheet probe against the corresponding 3D contoured outer surface of the cover sheet comprises the 3D contoured surface of the tip of the cover sheet probe following the corresponding 3D contoured outer surface of the cover sheet.

A fifth aspect relates to the method of any preceding aspect, wherein aligning the pedestal of the core with the cover sheet comprises aligning a 3D contoured surface of the pedestal with a corresponding 3D contoured surface of the inner surface of the cover sheet.

A sixth aspect relates to the method of any preceding aspect, wherein the 3D contoured surface of the inner surface of the cover sheet and the 3D contoured outer surface of the cover sheet are oppositely contoured 3D surfaces.

A seventh aspect relates to the method of any preceding aspect, wherein coupling the inner pedestal probe to the dual wall structure comprises positioning the inner pedestal probe in the core to include the pedestal as part of the conductive electrical path between the cover sheet probe and the inner pedestal probe, and wherein aligning the pedestal of the core with the cover sheet comprises applying a temporary shielding material between the pedestal and another pedestal adjacent the pedestal.

An eight aspect relates to the method of any preceding aspect, wherein heating the junction between the inner surface of the cover sheet abutting the pedestal and the pedestal by controlling the flow of electric power comprises heating the junction between the inner surface of the cover sheet and the pedestal to a localized maximum junction temperature of all junctions in the conductive electrical path between the cover sheet probe and the inner pedestal probe.

A ninth aspect relates to the method of any preceding aspect, wherein the pedestal is a plurality of pedestals, and the tip of the cover sheet probe comprises a corresponding plurality of tips, and wherein abutting the 3D contoured surface of the tip of the cover sheet probe against the corresponding 3D contoured outer surface of the cover sheet comprises aligning a pattern of the pedestals on the core with a matching pattern of the corresponding 3D contoured surfaces of the tips of the cover sheet probe such that each of the pedestals is aligned with one of the corresponding tips to create respective multiple maximum temperature junctions between the inner surface of the cover sheet and multiple respective pedestals.

A tenth aspect relates to the method of any preceding aspect, wherein the pedestal is a plurality of pedestals, and the cover sheet probe comprises a plurality of cover sheet probes each with a corresponding tip, and wherein abutting the tip of the cover sheet probe against the outer surface of the cover sheet comprises aligning a pattern of the pedestals on the core with a matching pattern of the cover sheet probes such that each of the pedestals is aligned with one of the corresponding tips to create respective multiple maximum temperature junctions between the cover sheet and multiple respective pedestals.

An eleventh aspect relates to the method of any preceding aspect, wherein aligning the pedestal of the core of the dual wall structure to abut the inner surface of the cover sheet of the dual wall structure comprises the initial step of applying a braze or diffusion agent to the pedestal, wherein the braze or diffusion agent is in the form of a powder, foil, or coatings/ion implantation.

A twelfth aspect related to the method of any preceding aspect, wherein coupling the inner pedestal probe to the dual wall structure comprises inserting the inner pedestal probe into a cooling channel inside of the core of the dual wall component, and coupling the inner pedestal probe to an interior wall of the cooling channel to direct the conductive electrical path through the pedestal.

A thirteenth aspect relates to a system comprising: a resistance welder; a cover sheet probe electrically coupled with the resistance welder, the cover sheet probe comprising a tip having a three dimensional (3D) contoured contacting area that follows a 3D contoured outer surface of a cover sheet of a core included in a dual wall structure; an inner pedestal probe electrically coupled with the resistance welder, the inner pedestal probe to electrically couple with the dual wall structure; and the resistance welder including a controller to control a supply of electric power to the cover sheet probe and control a pressing force of the tip of the cover sheet probe against the outer surface of the cover sheet, wherein the tip includes the 3D contoured contacting area to abut the 3D contoured outer surface of the cover sheet opposite an inner surface of the cover sheet, the inner surface abutting a pedestal included in the core, and the 3D contoured contacting area equal to or greater than a surface area of the pedestal contacting the inner surface of the cover sheet.

A fourteenth aspect relates to the system of aspect 13, wherein the 3D contoured contacting area of the tip of the cover sheet probe corresponds to only a portion of the 3D contoured surface of the cover sheet.

A fifteenth aspect relates to the system of any preceding aspect, wherein the 3D contoured contacting area of the tip creates a conductive electrical path of lower resistance between the 3D contacting area of the tip and the 3D contoured outer surface of the cover sheet as compared to a junction formed between the inner surface of the cover sheet and the pedestal.

A sixteenth aspect relates to the system of any preceding aspect, wherein the junction formed between the inner surface of the cover sheet and the pedestal is a localized maximum temperature junction along a conductive electrical path having a plurality of other junctions between the cover sheet probe and the inner pedestal probe.

A seventeenth aspect relates to the system of any preceding aspect, wherein the pedestal is a plurality of pedestals, and the tip of the cover sheet probe comprises a corresponding plurality of tips, wherein a pattern of the tips of the cover sheet probe match a pattern of the pedestals such that each of the pedestals is aligned with one of the corresponding tips.

An eighteenth aspect relates to the system of any preceding aspect, wherein the pedestal is a plurality of pedestals, and the cover sheet probe comprises a plurality of cover sheet probes and a corresponding plurality of respective tips, wherein a pattern of the respective tips of the cover sheet probes match a pattern of the pedestals such that each of the pedestals is aligned with one of the corresponding respective tips.

A nineteenth aspect relates to the system of any preceding aspect, wherein a 3D contoured outer surface of the pedestal follows a 3D contoured surface of the inner surface of the cover sheet, and the 3D contoured surface of the inner surface of the cover sheet is contoured opposite to the 3D contoured outer surface of the cover sheet.

A twentieth aspect relates to the system of any preceding aspect, wherein the inner pedestal probe is dimensioned for insertion into a cooling channel inside of the core of the dual wall component and is configured to couple with an interior wall of the cooling channel to form a conductive electrical path from the cover sheet probe through at least part of the pedestal to the inner pedestal probe.

In addition to the features mentioned in each of the independent aspects enumerated above, some examples may show, alone or in combination, the optional features mentioned in the dependent aspects and/or as disclosed in the description above and shown in the figures.

What is claimed is:

1. A system comprising:
   a dual wall structure, the dual wall structure including a core and a cover sheet, the cover sheet having a 3D contoured outer surface;
   a resistance welder;
   a cover sheet probe electrically coupled with the resistance welder, the cover sheet probe comprising a tip having a three dimensional (3D) contoured contacting area that follows the 3D contoured outer surface of the cover sheet of the dual wall structure;
   an inner pedestal probe electrically coupled with the resistance welder, the inner pedestal probe to electrically couple with the dual wall structure; and
   the resistance welder including a controller to control a supply of electric power to the cover sheet probe and control a pressing force of the tip of the cover sheet probe against the outer surface of the cover sheet, wherein the tip includes the 3D contoured contacting area to abut the 3D contoured outer surface of the cover sheet opposite an inner surface of the cover sheet, the inner surface abutting a pedestal included in the core, and the 3D contoured contacting area equal to or greater than a surface area of the pedestal contacting the inner surface of the cover sheet.

2. The system of claim 1, wherein the 3D contoured contacting area of the tip of the cover sheet probe corresponds to only a portion of the 3D contoured surface of the cover sheet.

3. The system of claim 2, wherein the 3D contoured contacting area of the tip creates a conductive electrical path of lower resistance between the 3D contacting area of the tip and the 3D contoured outer surface of the cover sheet as compared to a junction formed between the inner surface of the cover sheet and the pedestal.

4. The system of claim 1, wherein a junction formed between the inner surface of the cover sheet and the pedestal is a localized maximum temperature junction along a conductive electrical path having a plurality of other junctions between the cover sheet probe and the inner pedestal probe.

5. The system of claim 1, wherein the pedestal is a plurality of pedestals, and the tip of the cover sheet probe comprises a corresponding plurality of tips, wherein a pattern of the tips of the cover sheet probe match a pattern of the pedestals such that each of the pedestals is aligned with one of the corresponding tips.

6. The system of claim 1, wherein the pedestal is a plurality of pedestals, and the cover sheet probe comprises a plurality of cover sheet probes and a corresponding plurality of respective tips, wherein a pattern of the respective tips of the cover sheet probes match a pattern of the pedestals such that each of the pedestals is aligned with one of the corresponding respective tips.

7. The system of claim 1, wherein a 3D contoured outer surface of the pedestal follows a 3D contoured surface of the inner surface of the cover sheet, and the 3D contoured surface of the inner surface of the cover sheet is contoured opposite to the 3D contoured outer surface of the cover sheet.

8. The system of claim 1, wherein the inner pedestal probe is dimensioned for insertion into a cooling channel inside of the core and is configured to couple with an interior wall of the cooling channel to form a conductive electrical path from the cover sheet probe through at least part of the pedestal to the inner pedestal probe.

9. The system of claim 1, wherein the cover sheet, core, and pedestal are part of a turbine blade or a turbine vane.

10. The system of claim 1, wherein a 3D contoured surface of the inner surface of the cover sheet and the 3D contoured outer surface of the cover sheet are oppositely contoured 3D surfaces.

11. The system of claim 1, a 3D contoured surface of the pedestal aligns and corresponds with a 3D contoured surface of the inner surface of the cover sheet.

12. The system of claim 1, wherein the resistance welder is configured to resistance bond, diffusion bond, or braze bond.

13. The system of claim 1, wherein a braze or a diffusion agent is disposed on the pedestal between the pedestal and the coversheet.

14. A system comprising:
a resistance welder;
a cover sheet probe electrically coupled with the resistance welder, the cover sheet probe comprising a tip having a three dimensional (3D) contoured contacting area that follows a 3D contoured outer surface of a cover sheet of a dual wall structure;
an inner pedestal probe electrically coupled with the resistance welder, the inner pedestal probe to electrically couple with the dual wall structure; and
the resistance welder including a controller to control a supply of electric power to the cover sheet probe and control a pressing force of the tip of the cover sheet probe against the outer surface of the cover sheet, wherein the tip includes the 3D contoured contacting area to abut the 3D contoured outer surface of the cover sheet opposite an inner surface of the cover sheet, the inner surface abutting a pedestal included in the core, and the 3D contoured contacting area equal to or greater than a surface area of the pedestal contacting the inner surface of the cover sheet,
wherein the pedestal is a plurality of pedestals, and the tip of the cover sheet probe comprises a corresponding plurality of tips, and wherein the 3D contoured surface of the tip of the cover sheet probe is configured to abut the corresponding 3D contoured outer surface of the cover sheet, wherein a pattern of the pedestals included in the core match a pattern of the 3D contoured contacting surfaces of the corresponding plurality of tips of the cover sheet probe tip such that each of the pedestals aligns with one of the corresponding plurality of tips to create a respective maximum temperature junction between the cover sheet and a respective pedestal.

15. A system comprising:
a resistance welder;
a cover sheet probe electrically coupled with the resistance welder, the cover sheet probe comprising a tip having a three dimensional (3D) contoured contacting area that follows a 3D contoured outer surface of a cover sheet of a dual wall structure;
an inner pedestal probe electrically coupled with the resistance welder, the inner pedestal probe to electrically couple with the dual wall structure; and
the resistance welder including a controller to control a supply of electric power to the cover sheet probe and control a pressing force of the tip of the cover sheet probe against the outer surface of the cover sheet, wherein the tip includes the 3D contoured contacting area to abut the 3D contoured outer surface of the cover sheet opposite an inner surface of the cover sheet, the inner surface abutting a pedestal included in the core, and the 3D contoured contacting area equal to or greater than a surface area of the pedestal contacting the inner surface of the cover sheet,
wherein the pedestal is a plurality of pedestals, and the cover sheet probe comprises a plurality of cover sheet probes each with a corresponding tip, and wherein the tip of the cover sheet probe is configured to abut against the outer surface of the cover sheet, wherein a pattern of the pedestals included in the core match a pattern of the 3D contoured contacting surfaces of the corresponding tips of the coversheet probe such that each of the pedestals aligns with one of the corresponding tips to create a respective maximum temperature junction between the cover sheet and a respective pedestal.

* * * * *